(12) United States Patent
Mizuno

(10) Patent No.: US 9,876,941 B2
(45) Date of Patent: Jan. 23, 2018

(54) IMAGE FORMING APPARATUS, DECOLORING APPARATUS AND IMAGE FORMING METHOD

(71) Applicants: KABUSHIKI KAISHA TOSHIBA, Tokyo (JP); TOSHIBA TEC KABUSHIKI KAISHA, Tokyo (JP)

(72) Inventor: Masanaka Mizuno, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 14/853,572

(22) Filed: Sep. 14, 2015

(65) Prior Publication Data

US 2016/0088192 A1    Mar. 24, 2016

(30) Foreign Application Priority Data

Sep. 22, 2014  (JP) ................................ 2014-192140
Aug. 28, 2015  (JP) ................................ 2015-168895

(51) Int. Cl.
*H04N 1/60* (2006.01)
*G03F 3/08* (2006.01)
*H04N 1/44* (2006.01)

(52) U.S. Cl.
CPC ............. *H04N 1/60* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,720,301 A * | 1/1988 | Kito | ....................... | B41M 5/305 106/31.17 |
| 5,712,673 A * | 1/1998 | Hayashi | ................... | B41J 2/305 347/172 |
| 6,017,386 A * | 1/2000 | Sano | ....................... | C09D 11/50 106/31.32 |
| 6,203,603 B1 * | 3/2001 | Takayama | .............. | B41M 5/128 106/31.16 |
| 6,277,208 B1 * | 8/2001 | Sano | ....................... | C09D 11/50 134/15 |
| 6,326,332 B1 * | 12/2001 | Takayama | .............. | B41M 5/305 106/31.17 |
| 6,329,317 B1 * | 12/2001 | Takayama | ............ | G03G 9/0928 503/201 |
| 6,395,191 B1 * | 5/2002 | Schell | .................... | B42D 25/43 216/65 |

(Continued)

*Primary Examiner* — Madelein Nguyen
(74) *Attorney, Agent, or Firm* — Patterson & Sheridan, LLP

(57) ABSTRACT

In one embodiment, an image forming apparatus forms an image on a recording medium using a plurality of decolorable coloring materials having different decoloring conditions. Further, the image forming apparatus forms a mark relating to authority information indicating authority capable of decoloring one of the plurality of decolorable coloring materials for each of the decolorable coloring materials on the recording medium. Further, in another embodiment, a decoloring apparatus grasps the authority information, and decolors the image of the decolorable coloring material, in accordance with the grasped authority information.

16 Claims, 13 Drawing Sheets

(56) References Cited

U.S. PATENT DOCUMENTS

| | | | |
|---|---|---|---|
| 6,535,706 B1* | 3/2003 | Konno | H04N 1/626 358/452 |
| 6,700,679 B1* | 3/2004 | Fujita | H04N 1/502 358/1.9 |
| 8,097,389 B2* | 1/2012 | Nakamura | G03G 9/0906 430/106.1 |
| 8,465,897 B2* | 6/2013 | Aoki | G03G 9/08755 399/252 |
| 9,213,286 B1* | 12/2015 | Ogasawara | G03G 15/0189 |
| 2001/0040701 A1* | 11/2001 | Edgar | H04N 1/21 358/302 |
| 2002/0135788 A1* | 9/2002 | Arakawa | G03C 1/49881 358/1.1 |
| 2003/0035149 A1* | 2/2003 | Ishikawa | G03C 8/4013 358/302 |
| 2005/0191082 A1* | 9/2005 | Takayama | B41J 29/26 399/101 |
| 2007/0273941 A1* | 11/2007 | Ito | G03G 9/0926 358/518 |
| 2008/0003019 A1* | 1/2008 | Kikuchi | G03G 15/0121 399/227 |
| 2008/0013970 A1* | 1/2008 | Kikuchi | G03G 15/5062 399/45 |
| 2010/0091307 A1* | 4/2010 | Kimura | B23K 26/0661 358/1.9 |
| 2010/0214373 A1* | 8/2010 | Carr | B41M 3/142 347/73 |
| 2010/0272449 A1* | 10/2010 | Yoshida | H04N 1/32133 399/2 |
| 2010/0310300 A1* | 12/2010 | Fujita | B41M 5/305 401/209 |
| 2011/0199625 A1* | 8/2011 | Sugimoto | H04N 1/00867 358/1.9 |
| 2011/0205601 A1* | 8/2011 | Akimoto | G03G 21/046 358/475 |
| 2011/0222130 A1* | 9/2011 | Iguchi | G03G 15/5062 358/452 |
| 2012/0082472 A1 | 4/2012 | Tonohiro | |
| 2012/0141154 A1 | 6/2012 | Yoshida | |
| 2012/0162723 A1* | 6/2012 | Fujii | H04N 1/2346 358/474 |
| 2012/0212564 A1* | 8/2012 | Yamamoto | B41J 2/4753 347/225 |
| 2012/0327487 A1* | 12/2012 | Kamisuwa | B41M 7/0009 358/527 |
| 2013/0016375 A1* | 1/2013 | Hashidume | G06F 3/1222 358/1.9 |
| 2013/0016376 A1* | 1/2013 | Hashidume | G03G 15/01 358/1.9 |
| 2013/0070265 A1* | 3/2013 | Megawa | H04N 1/40 358/1.9 |
| 2013/0070305 A1* | 3/2013 | Tomizawa | H04N 1/00127 358/3.28 |
| 2013/0077983 A1* | 3/2013 | Kashiwagi | G03G 21/00 399/15 |
| 2013/0235432 A1* | 9/2013 | Shokai | G03G 21/00 358/3.28 |
| 2013/0258026 A1* | 10/2013 | Iguchi | B41M 7/0009 347/179 |
| 2013/0258368 A1* | 10/2013 | Shigemoto | H04N 1/00082 358/1.9 |
| 2014/0376008 A1* | 12/2014 | Yamaguchi | B41J 11/008 358/1.5 |
| 2015/0029286 A1* | 1/2015 | Yagi | B41M 7/0009 347/179 |
| 2015/0234328 A1* | 8/2015 | Imamiya | H04N 1/32101 399/69 |
| 2015/0251439 A1* | 9/2015 | Kawaguchi | B41J 2/335 347/179 |
| 2015/0294202 A1* | 10/2015 | Kimoto | G06K 15/1868 358/1.9 |
| 2015/0319326 A1* | 11/2015 | Pfeiffer | H04N 1/465 358/474 |
| 2015/0338800 A1* | 11/2015 | Ueno | G03G 15/2039 399/69 |
| 2016/0041514 A1* | 2/2016 | Hashimoto | G03G 15/50 399/67 |
| 2016/0067998 A1* | 3/2016 | Numakura | B41M 7/0009 347/179 |
| 2016/0067999 A1* | 3/2016 | Hiyoshi | B41M 7/0009 347/179 |
| 2016/0070997 A1* | 3/2016 | Takahashi | H04N 1/00801 358/3.24 |
| 2016/0088192 A1* | 3/2016 | Mizuno | H04N 1/60 358/1.9 |
| 2016/0144645 A1* | 5/2016 | Moro | G03G 15/6585 358/2.1 |
| 2016/0364635 A1* | 12/2016 | Namura | G06K 15/18 |

* cited by examiner

| USER MANAGEMENT DATABASE | | |
|---|---|---|
| FULL NAME | USER ID | USER INFORMATION |
| ICHIRO YAMADA | 001 | PRESIDENT |
| WATARU TANAKA | 002 | DIRECTOR |
| YOSHIKO SAKUMA | 003 | DIRECTOR |
| MICHIKO HOSHINO | 004 | MANAGER |
| SUSUMU SATO | 005 | NO POST |

Fig.3

| RECORDING MEDIUM MANAGEMENT | | | | |
|---|---|---|---|---|
| RECORDING MEDIUM ID | PASSWORD | COLORING MATERIAL TO BE USED | IMAGE AREA | AUTHORITY INFORMATION |
| P001 | ****** | COLORING MATERIAL 1<br>COLORING MATERIAL 2 | LOWER<br><br>UPPER | DIRECTOR OR HIGHER<br>NOT SET |
| P002 | NOT SET | COLORING MATERIAL 1 | WHOLE AREA | MANAGER OR HIGHER |
| P003 | ****** | COLORING MATERIAL 1<br>COLORING MATERIAL 2<br>COLORING MATERIAL 3 | LEFT<br><br>CENTER<br><br>RIGHT | PRESIDENT<br><br>DIRECTOR<br><br>MANAGER |
| P004 | ****** | COLORING MATERIAL 1<br>COLORING MATERIAL 2 | LOWER LEFT<br><br>UPPER RIGHT | DIRECTOR OR HIGHER<br>MANAGER OR HIGHER |
| ... | ... | ... | ... | ... |

Fig.4

IMAGE FORMING APPARATUS, DECOLORING APPARATUS AND IMAGE FORMING METHOD

CROSS-REFERENCE TO RELATED APPLICATION

This application is based upon and claims the benefit of priority from the prior Japanese Patent Application No. 2014-192140, filed on Sep. 22, 2014, the entire contents of which are incorporated herein by reference.

This application is also based upon and claims the benefit of priority from the prior Japanese Patent Application No. 2015-168895, filed on Aug. 28, 2015, the entire contents of which are incorporated herein by reference.

FIELD

Embodiments described herein relate generally to an image forming apparatus, a decoloring apparatus and an image forming method.

BACKGROUND

Conventionally, an image forming apparatus which forms an image on a recording medium such as a sheet using decolorable coloring material, and a decoloring apparatus which decolors an image of decolorable coloring material that has previously been formed on a sheet for reusing the sheet are known.

Further, an image forming apparatus having the above-described decoloring apparatus in the apparatus is also known.

The decolorable coloring material is coloring material which can be decolored by a prescribed condition, such as to be heated at a prescribed decoloring temperature, for example.

When reusing a sheet, the above-described image forming apparatus superposes an image of decolorable coloring material, to form a new image.

That is, the above-described image forming apparatus, in a sheet in which an image of decolorable coloring material has been decolored by the above-described decoloring apparatus, superposes an image of decolorable coloring material on the decolored image of the decolorable coloring material, to form a new image.

In the above-described decolored image of the decolorable coloring material, the color thereof is merely decolored. Accordingly, the decolorable coloring material remains on the sheet, after the above-described decoloring.

For this reason, regarding the decolored image, a problem of security, for example, may occur sometimes. In addition, when a sheet is repeatedly reused, the visibility of an image which is to be newly formed on the sheet may deteriorate.

An image forming apparatus is known which, in order to solve the above-described security problem, and to improve the visibility of an image, once forms an image (a solid image, for example) for coating with decolorable coloring material, on the whole surface of the image of the decolorable coloring material to be decolored.

This image forming apparatus superposes an image of decolorable coloring material on the image for coating, to form a new image.

In addition, an image forming apparatus is also known, which forms an image using a ground tint printing art, as an object to solve the above-described security problem.

On the other hand, a hybrid type image forming apparatus is also known, which can form an image using the above-described decolorable coloring material and non-decolorable coloring material.

Further, an image forming apparatus is also known, which forms an image using a plurality of decolorable coloring materials having different decoloring temperatures.

However, even in these image forming apparatuses, the above-described security problem exists, and an image forming method and a decoloring method which are suited for solving this problem has been desired from users.

In addition, the above-described decoloring apparatus can decolor all images of decolorable coloring material formed on a sheet, but cannot selectively decolor images of a plurality of the above-described decolorable coloring materials having the different decoloring temperatures.

BRIEF DESCRIPTION OF THE DRAWINGS

FIG. 3 is a diagram showing a configuration example of a user management database used in the image processing apparatus according to the embodiment.

FIG. 4 is a diagram showing a configuration example of a recording medium management database used in the image processing apparatus according to the embodiment.

DETAILED DESCRIPTION

Figure 1:
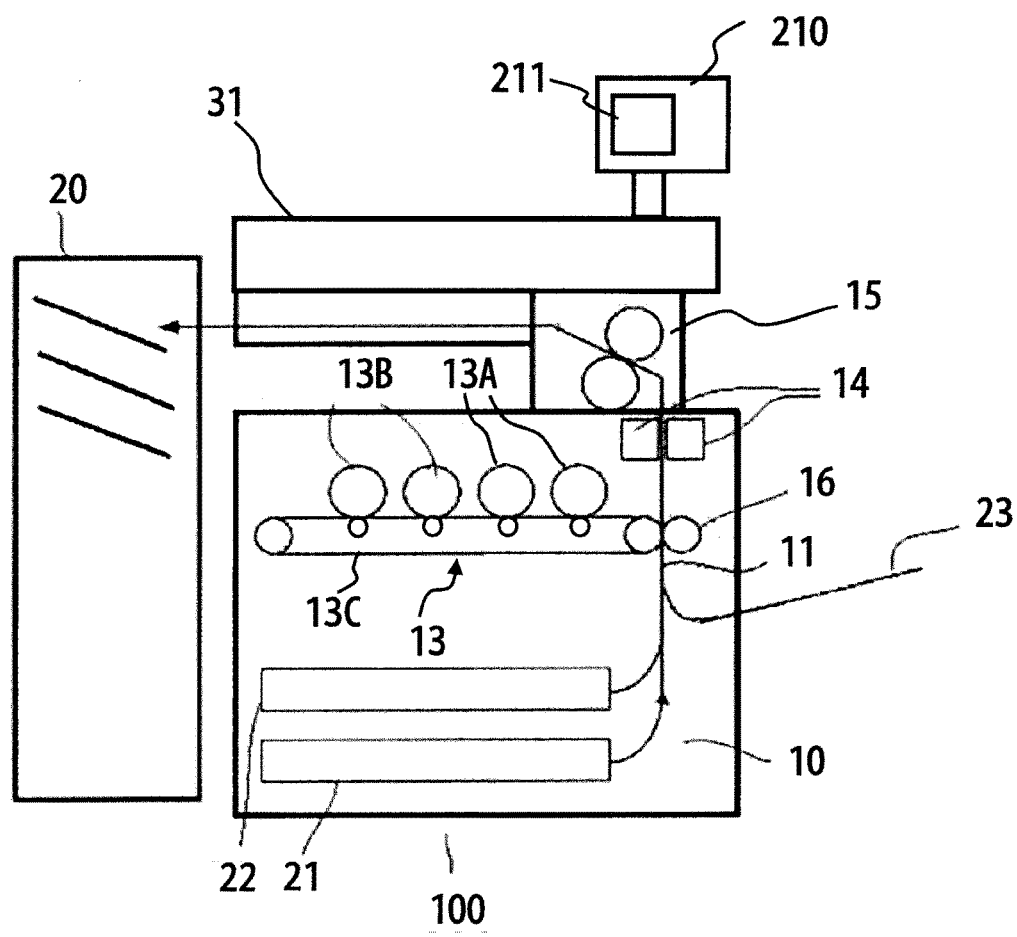
FIG. 1 is a sectional view showing a main portion of an image processing apparatus according to an embodiment.

According to one embodiment, an image forming apparatus has a control unit and an image forming unit.

The control unit generates authority information indicating authority capable of decoloring one of a plurality of decolorable coloring materials, for each of the decolorable coloring materials that are decolored at different prescribed decoloring conditions.

The image forming unit forms an image on a recording medium using the plurality of decolorable coloring materials, and forms a mark relating to the authority information on the recording medium.

According to one embodiment, a decoloring apparatus has a decoloring unit and a control unit.

The decoloring unit decolors an image formed on a recording medium using a plurality of decolorable coloring materials having different decoloring conditions.

The control unit grasps authority information indicating authority capable of decoloring one of the decolorable coloring materials, for each of the decolorable coloring materials. Further the control unit controls a decoloring operation of the decoloring unit, so that the image of the decolorable coloring material is decolored, in accordance with the grasped authority information.

Hereinafter, further embodiments will be described with reference to the drawings. In the drawings, the same symbols indicate the same or similar portions.

FIG. 1 is a sectional view showing a main portion of an image processing apparatus according to an embodiment. An image processing apparatus 100 functions as an image forming apparatus and an image decoloring apparatus.

Specifically, as shown in FIG. 1, the image processing apparatus 100 has a document reading unit 31, so as to function as an image forming apparatus.

The document reading unit 31 scans a document which is set on a document table or a document automatic feeder not shown by a user, to output image data of the document.

Further, the image processing apparatus 100 has an image forming unit 13, so as to function as an image forming apparatus.

The image forming unit 13 forms an image on a recording medium such as a sheet, using decolorable coloring material and non-decolorable coloring material.

The decolorable coloring material is coloring material which can be decolored by a prescribed condition. In the present embodiment, an example to use coloring material which is decolored at a prescribed decoloring temperature, as described later, as the prescribed condition, will be described.

The image forming unit 13 includes a first image forming unit 13A, a second image forming unit 13B, a transfer belt 13C, and a transfer roller 16 shown in FIG. 1.

Further, the image processing apparatus 100 has a sheet feeding unit 10, a conveying path 11, a heating unit 15, and a sheet discharge unit 20, so as to function as an image forming apparatus and an image decoloring apparatus. Further, the image processing apparatus 100 has a sheet reading unit 14 which operates in the case of functioning as an image decoloring apparatus.

The sheet feeding unit 10 feeds a sheet inside the image processing apparatus 100, in order to form an image on the sheet, or decolor an image of decolorable coloring material formed on the sheet.

The sheet feeding unit 10 has a plurality of sheet feeding trays 21, 22 each for housing a sheet which has been previously set by a user, for image forming or for image decoloring.

Further, the sheet feeding unit 10 has a sheet feeding tray 23 for holding a sheet which is set by a user each time, for image forming or for image decoloring. The sheet feeding unit 10 takes out a sheet from any of the sheet feeding trays 21-23 using pickup rollers not shown which are provided corresponding to the sheet feeding trays 21-23, and sends out the sheet to the conveying path 11.

The conveying path 11 has a plurality of conveying rollers not shown. Each conveying roller is a roller pair including a drive roller and a driven roller.

The transfer roller 16, the sheet reading unit 14, the heating unit 15 are arranged on the conveying path 11 in order from the upstream side.

The conveying path 11 conveys the sheet fed from the sheet feeding trays 21-23 to the transfer roller 16, the sheet reading unit 14, and the heating unit 15 in order, and further conveys the sheet to the sheet discharge unit 20.

The first image forming unit 13A forms an image using non-decolorable coloring material.

The second image forming unit 13B forms an image using decolorable coloring material.

Accordingly, the image processing apparatus 100 is a so-called hybrid type image forming apparatus.

The first image forming unit 13A and the second image forming unit 13B are arranged along the transfer belt 13C. Each of the first image forming unit 13A and the second image forming unit 13B has process means not shown, such as a photoconductor, a charger, an exposure device, a developing device, and a transfer device, in order to form an image with a well-known electrophotographic system, for example.

The first image forming unit 13A and the second image forming unit 13B respectively form images of the coloring materials on the photoconductors, and transfer these formed images of the coloring materials to the transfer belt 13C.

The transfer belt 13C endlessly runs in the counter-clockwise direction in FIG. 1. The above-described first image forming unit 13A and second image forming unit 13B are arranged along this transfer belt 13C, in order from the upstream in the running direction of the transfer belt 13C.

Accordingly, when the image processing apparatus 100 forms an image using both of non-decolorable coloring material and decolorable coloring material, images are transferred to the transfer belt 13C in a state that an image of the decolorable coloring material is superposed on an image of the non-decolorable coloring material.

The transfer belt 13C endlessly runs, to convey the above-described image of the coloring materials to a position to contact the transfer roller 16.

The transfer roller 16 transfers the above-described image on the transfer belt 13C to a sheet which has been conveyed along the above-described conveying path 11, for image forming.

Accordingly, when the image processing apparatus 100 forms an image using both of non-decolorable coloring material and decolorable coloring material, an image in which an image of the decolorable coloring material is superposed on an image of the non-decolorable coloring material is transferred to a sheet.

The above-described non-decolorable coloring material and decolorable coloring material are toners used in an electrophotographic system. The decolorable coloring material is heated at a prescribed decoloring temperature, and thereby is decolored and become transparent. Even when the non-decolorable coloring material is heated at the above-described decoloring temperature, it is not decolored.

The image processing apparatus 100 has the two first image forming units 13A, and the two second image forming units 13B, as shown in FIG. 1. The two first image forming units 13A form images using non-decolorable coloring materials of different colors, respectively.

In addition, the image processing apparatus 100 may have the four first image forming units 13A, of the first image forming unit 13A having cyan coloring material, the first image forming unit 13A having yellow coloring material, the first image forming unit 13A having magenta coloring material, the first image forming unit 13A having black coloring material, in order to form a full color image. The four first image forming units 13A in this case are also arranged along the transfer belt 13C.

The first image forming unit 13A forms an image based on the image data of document outputted by the above-described document reading unit 31, in a first normal print mode described later.

Specifically, the first image forming unit 13A forms an electrostatic latent image based on the image data of document on the above-described photoconductor. The first image forming unit 13A further feeds the above-described non-decolorable coloring material to the photoconductor, and develops the electrostatic latent image, using the above-described developing device. The electrostatic latent image has been developed, and thereby an image of the non-decolorable coloring material is formed on the photoconductor. The image of the non-decolorable coloring material is transferred to the sheet by the transfer belt 13C and the transfer roller 16, as described above.

In addition, the first image forming unit 13A forms an image based on the image data of document, and forms a print mark 1003 (refer to FIG. 10) relating to authority information described later, in a security print mode described later.

Specifically, the first image forming unit 13A forms an electrostatic latent image based on the image data of document, and an electrostatic latent image corresponding to the print mark 1003, on the above-described photoconductor. Further, the first image forming unit 13A feeds the above-described non-decolorable coloring material to the photoconductor and develops the electrostatic latent image using the above-described developing device, to form an image of the non-decolorable coloring material on the photoconductor. The image of the non-decolorable coloring material is transferred to a sheet by the transfer belt 13C and the transfer roller 16, in the same manner as the above-described first normal print mode.

In addition, the above-described image data of document includes image data of, such as various characters, diagrams, photographs. For example, the image processing apparatus 100 can also acquire image data of document from an external device, via an I/F (Interface) 206 described later.

On the other hand, the above-described two second image forming units 13B form images using first and second decolorable coloring materials with different decoloring temperatures, respectively.

The second image forming unit 13B forms an image based on the above-described image data of document, in a second normal print mode describe later. The image forming method in the second normal print mode is the same as the above-described first normal print mode, except that the coloring material to be used is different.

The second image forming unit 13B further forms a coating image (a solid image, for example) to cover the above-described image of the non-decolorable coloring material, in the security print mode.

Specifically, the second image forming unit 13B feeds decolorable coloring material to the above-described photoconductor using the above-described developing device, to form a solid image.

The solid image of the decolorable coloring material is transferred to the transfer belt 13C, so as to be superposed on a part or the whole surface of the image of the non-decolorable coloring material which has been previously transferred to the transfer belt 13C.

The image of the non-decolorable coloring material and the coating image (solid image) of the decolorable coloring material are transferred to a sheet by the transfer belt 13C and the transfer roller 16, in the same manner as the above-described first and second normal print modes.

First decolorable coloring material is black coloring material, for example, and its decoloring temperature is 140° C. Second decolorable coloring material is blue coloring material, for example, and its decoloring temperature is 130° C.

Accordingly, one second image forming unit 13B forms an image using the above-described black first decolorable coloring material having the high decoloring temperature. The other second image forming unit 13B forms an image using the above-described blue second decolorable coloring material having the low decoloring temperature.

That is, the second image forming units 13B form images using a plurality of the decolorable coloring materials having different decoloring temperatures, respectively.

The number of the second image forming units 13B and the number (the number of kinds) of the decolorable coloring materials to be used are not particularly limited, but in the case of the security print mode, as the number of the decolorable coloring materials is larger, the more stepwise protection and release of the security can be realized.

In the present embodiment, the second image forming unit 13B is detachably loaded on the image processing apparatus 100. Accordingly, the above-described two second image forming units 13B having the above-described first and second decolorable coloring materials can be exchanged by the second image forming units 13B having third and fourth decolorable coloring materials. The third decolorable coloring material has a decoloring temperature of about 120° C., and the fourth decolorable coloring material has a decoloring temperature of about 110° C.

The colors of the third and fourth decolorable coloring materials may be the same colors of the above-described first and second decolorable coloring materials, or may be different colors.

The second image forming units 13B are exchanged, and thereby the image processing apparatus 100 can form an image using the decolorable coloring materials of four kinds.

As described above, the image of the above-described coloring material which has been transferred to the transfer belt 13C is carried by the transfer belt 13C, and thereby is conveyed toward the transfer roller 16, and is transferred to a sheet by the transfer roller 16. The sheet to which the image of the coloring material has been transferred is conveyed along the conveying path 11 to the sheet reading unit 14, and the heating unit 15 in order, and then discharged to the sheet discharge unit 20.

The sheet discharge unit 20 has a plurality of discharge trays, and houses the sheet on which the image of the above-described coloring material is formed in any of the discharge trays.

Figure 2:
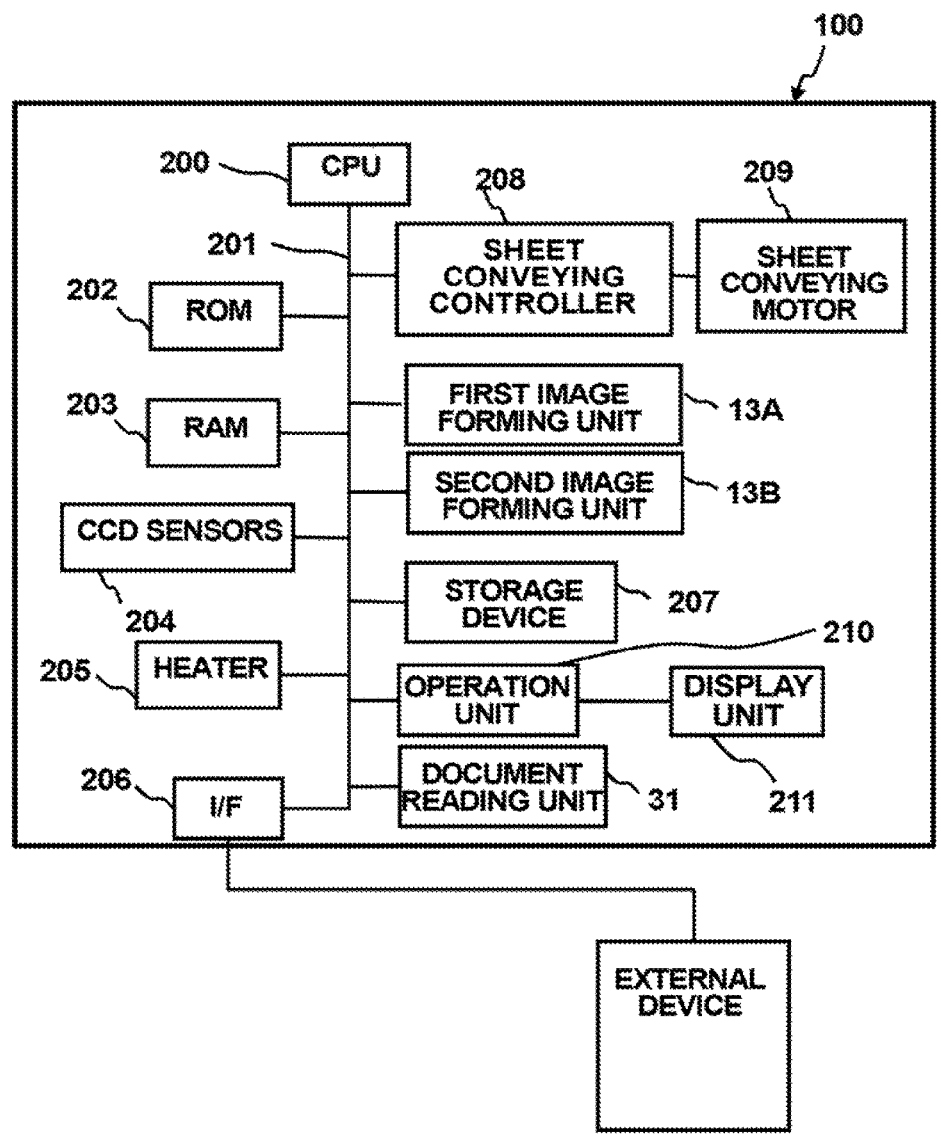
FIG. 2 is a block diagram showing the image processing apparatus according to the embodiment.

The sheet reading unit 14 has a pair of two-dimensional CCD (Charge Coupled Device) sensors 204 (refer to FIG. 2).

The sheet reading unit 14 reads one surface of a sheet to be conveyed by the two-dimensional CCD sensor 204 at one side, and reads the opposite surface by the two-dimensional CCD sensor 204 at the other side.

The image data on the surface of the sheet read by the sheet reading unit 14 is stored in a RAM (Random Access Memory) 203 that is a storage unit (refer to FIG. 2).

A storage destination of the image data read by the sheet reading unit 14 is not limited to the RAM 203, but may be another internal device such as a storage device 207 (refer to FIG. 2), or may be an external device (refer to FIG. 2). The external device includes a network server, a user PC (Personal Computer) not shown or the like, for example.

When the image processing apparatus 100 functions as a decoloring apparatus, the sheet reading unit 14 performs a reading operation of the above-described sheet surface, prior to decoloring processing described later, so as to extract the print mark 1003 (refer to FIG. 10) relating to authority information printed on the sheet. The print mark 1003 includes data corresponding to a recording medium ID described later. In other words, the sheet reading unit 14 performs a reading operation of the above-described sheet surface, so as to extract the recording medium ID. The image processing apparatus 100 grasps authority information described later, based on the recording medium ID extracted using the sheet reading unit 14.

The heating unit 15 has a roller pair incorporating a heater 205 (refer to FIG. 2), and heats the whole surface of a sheet passing through the roller pair.

The heating unit 15 functions as a fixing unit when the image processing apparatus 100 functions as an image forming apparatus, and functions as a decoloring unit when the image processing apparatus 100 functions as a decoloring apparatus.

When the heating unit 15 functions as a fixing unit, a heating temperature of the heating unit 15 is controlled to a prescribed fixing temperature by a CPU 200 (refer to FIG. 2), for example. The fixing temperature is a temperature at which the above-described decolorable coloring material and non-decolorable coloring material are fixed to a sheet. Further, the fixing temperature is a temperature lower than the above-described decoloring temperature. The heater 205 of the heating unit 15 heats the roller pair at the time of image forming. The roller pair of the heating unit 15 heats the image of the decolorable coloring material and the image of the non-decolorable coloring material which have been transferred to a sheet at the fixing temperature, to fix the image to the sheet.

Meanwhile, when the heating unit 15 functions as a decoloring unit, a heating temperature of the heating unit 15 is selectively controlled by the CPU 200 to a decoloring temperature, in accordance with the kind of the decolorable coloring material, such as a decoloring temperature of the first decolorable coloring material or a decoloring temperature of the second decolorable coloring material.

The heater 205 of the heating unit 15 heats the roller pair at the time of image decoloring. The roller pair of the heating unit 15 heats the image of the decolorable coloring material transferred to one surface or both surfaces of a sheet at the decoloring temperature, to decolor the image.

The sheet which has been subjected to the fixing processing or the decoloring processing by the heating unit 15 is discharged to any of the discharge trays of the sheet discharge unit 20.

To which discharge tray the sheet is to be discharged is determined by default setting, and further can be changed by the setting based on an input operation of a user.

FIG. 2 is a block diagram of the image processing apparatus 100. As shown in FIG. 2, the image processing apparatus 100 has the CPU (Central Processing Unit) 200 that is a control unit. Further, the image processing apparatus 100 has a ROM (Read Only Memory) 202, the RAM 203, and the I/F (Interface) 206, which are connected to the CPU 200 via a system bus 201. The I/F 206 is connected to an external device, so as to input data from the external device and output data to the external device. The CPU 200 can communicate with various external devices by the I/F 206 to which the CPU 200 is connected via the system bus 201.

In addition, the document reading unit 31, the two-dimensional CCD sensors 204 of the sheet reading unit 14, the heater 205 of the heating unit 15, and the first and second image forming units 13A, 13B which have been described above are further connected to the CPU 200 via the system bus 201.

Further, the image processing apparatus 100 has the storage device 207 such as an HDD (Hard Disk Drive), a sheet conveying controller 208, and an operation unit 210 including a display unit 211 which are connected to the CPU 200 via the system bus 201, and has a sheet conveying motor 209 connected to the sheet conveying controller 208. The sheet conveying motor 209 drives the above-described conveying rollers arranged on the conveying path 11. The sheet conveying controller 208 controls the sheet conveying motor 209.

The ROM 202 stores a program for operating the CPU 200, and various data (parameters) for default setting of the respective units of the apparatus, and so on.

The RAM 203 stores the image data which is obtained when the sheet surface is read by the CCD sensor 204 of the sheet reading unit 14. The CCD sensors 204 are arranged at the both sides of the conveying path 11 as line sensors of a line, and each detects shade of a color on the sheet surface, to read an image on the sheet surface.

The heater 205 heats the roller pair of the heating unit 15 to a prescribed temperature, for the fixing processing and the decoloring processing as described above. The roller pair of the heating unit 15 heats the passing sheet by the heat of the heater 205. A heat source such as an IH heater is used as the heater 205.

The storage device 207 is an HDD, for example, and stores a user management database and a recording medium management database, described later.

Further, the storage device 207 stores the relevant setting data (parameter), in the case that a manager or a user has changed by a setting input, to the default setting of the respective units of the apparatus.

Further, the storage device 207 can store data of the operation history of the apparatus, and other various data to be stored.

FIG. 3 is a diagram showing an example of a user management database which is to be stored in the storage device 207.

FIG. 4 is a diagram showing an example of a recording medium management database which is to be stored in the storage device 207.

The user management database is a database for managing a user who uses the image processing apparatus 100.

In the user management database, a full name, a user ID, and user information are registered for each user, in association with each user, as shown in FIG. 3.

The user ID is identification data for identify a user.

The user information is post information of a user in an organization which the user belongs to, for example. In the user management database of FIG. 3, post information such as "president", "director", "manager", "no post" is registered, as the user information.

The recording medium management database is a database for managing authority information described later for each sheet that is recording medium.

The recording medium management database is a database which is referred to for decoloring an image (coating image) of the decolorable coloring material formed on a sheet in the security print mode, but may be referred to for decoloring an image of the decolorable coloring material formed on a sheet in the second normal print mode.

Hereinafter, the recording medium management database will be described as a database which is referred to for decoloring a coating image of the decolorable coloring material formed on a sheet in the security print mode.

In the recording medium management database, a password, coloring material to be used, an image area, and authority information are registered, in association with the recording medium ID, as shown in FIG. 4.

The recording medium ID is identification data for identifying a sheet, and is data which is given to each sheet at the time of image forming.

The password is data unique to a user such as a character string which is inputted by a user at the time of image forming.

The coloring material to be used is a kind of decolorable coloring material to be used in a coating image. In FIG. 4, "coloring material 1" corresponds to the above-described first decolorable coloring material, "coloring material 2" corresponds to the above-described second decolorable coloring material, "coloring material 3" corresponds to the above-described third decolorable coloring material, "coloring material 4" corresponds to the above-described fourth decolorable coloring material.

The image area is an area where a coating image is formed on a sheet. In FIG. 4, "upper" means an upper area in a sheet. "Lower" means a lower area in a sheet. "Whole area" means the whole area in a sheet. "Left" means a left area in a sheet. "Right" means a right area in a sheet. "Center" means an intermediate area in a sheet. "Lower left" means a lower left area in a sheet. "Upper right" means an upper right area in a sheet.

The authority information is information indicating authority capable of decoloring one of a plurality of decolorable coloring materials, for each of the decolorable coloring materials. Specifically, the authority information is user information indicating a specific user who is given with the authority capable of decoloring an image of decolorable coloring material, for each decolorable coloring material. For example, in the recording medium management database of FIG. 4, information, such as "president", "director", "manager", "director or higher", "manager or higher", "not set", is registered, as the authority information.

"President" means to give authority capable of decoloring to only a user who is a president. "Director" means to give authority capable of decoloring to only a user who is a director. "Manager" means to give authority capable of decoloring to only a user who is a manager. "Director or higher" means to give authority capable of decoloring to only a director and an officer superior to a director (in the present embodiment, a president). "Manager or higher" means to give authority capable of decoloring to only a manager and an officer superior to a manager (in the present embodiment, a president and a director). "Not set" means to give authority capable of decoloring to all users including a president, a director, a manager and an ordinary person without any post.

For example, according to the recording medium management database of FIG. 4, in a sheet given with a recording medium ID "P001", a password is set, an image of the coloring material 1 is formed in a lower area, and authority capable of decoloring the image of the coloring material 1 is given to a user of a director or higher, that is a president and a director. Further, in the sheet given with the recording medium ID "P001", an image of the coloring material 2 is formed in an upper area, and authority capable of decoloring the image of the coloring material 2 is given to a user of "not set", that is all users.

In addition, the above-described authority information is generated by the CPU 200, based on setting content inputted by a user in an authority information input portion 211C1 of a second setting screen 211C (refer to FIG. 8) described later. The CPU 200 registers this generated authority information in the recording medium management database, in association with the recording medium ID.

The operation unit 210 has the display unit 211 and various operation keys, and is arranged above the apparatus main body, for example, as shown in FIG. 1.

The various keys of the operation unit 210 include a numeric keypad, a stop key, a start key, and so on. The operation unit 210 accepts various setting inputs and instruction inputs of a user relating to image forming and image decoloring, and so on, via the various operation keys.

The display unit 211 displays setting information including various processing modes of the image processing apparatus 100, an operation status, log information, or a message to a user. The display unit 211 includes a display of a touch panel system. The operation unit 210 accepts various setting inputs and instruction inputs of a user from the display unit 211 as well.

Accordingly, a user can perform instruction of start and stop (interruption), setting for changing various initial setting conditions, and so on, for example, regarding the image forming and the image decoloring, via the operation unit 210.

In addition, the CPU 200 extracts the print mark 1003 relating to the authority information from the image data read by the sheet reading unit 14, and thereby recognizes the above-described corresponding recording medium ID and controls decoloring processing described later.

Figure 5:
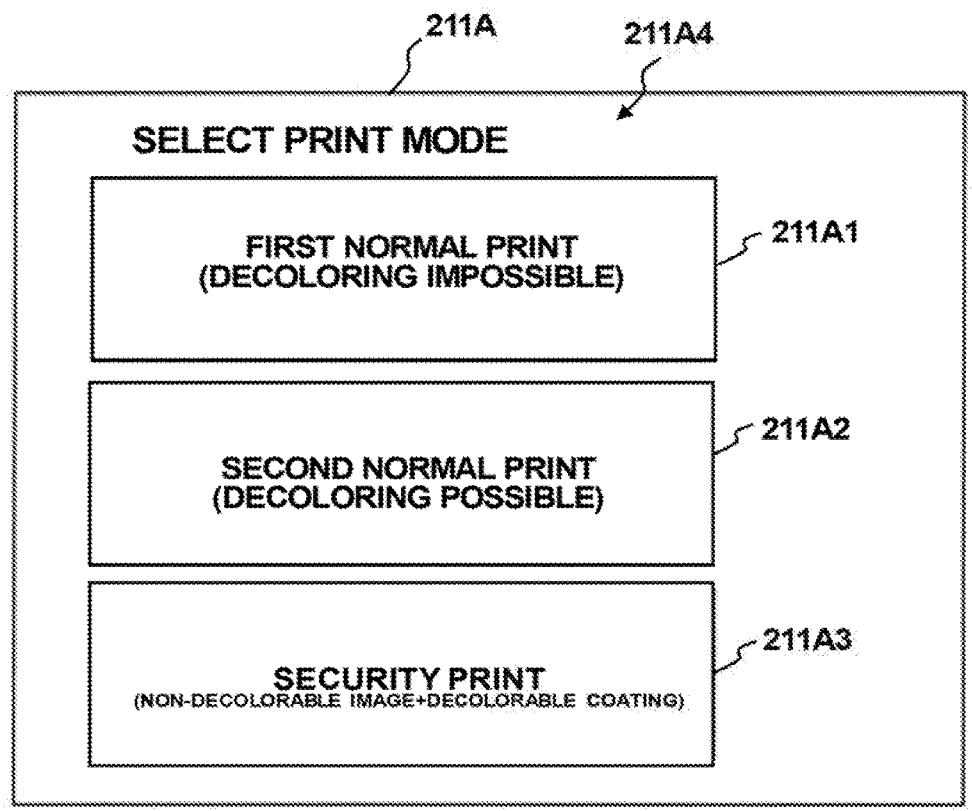
FIG. 5 is a diagram showing an example of a screen which the image processing apparatus according to the embodiment displays prior to image forming.

FIG. 5 is a diagram showing a screen displayed on the display unit 211, when the image processing apparatus 100 performs image forming in accordance with the image data of document acquired from the document reading unit 31, or performs image forming in accordance with the image data of document acquired from an external device such as a client PC. In addition, the screen shown in FIG. 5 and screens of FIG. 7, FIG. 8 described later may be displayed on a display unit of a client PC or the like.

The display unit 211 displays a selection screen 211A so as to select a print mode, as shown in FIG. 5.

The print mode is a mode in which the image processing apparatus 100 perform image forming. The print mode includes a normal print mode, and a security print mode. The normal print mode includes a first and a second normal print mode.

The first normal print mode is a print mode in which an image is formed using the above-described non-decolorable coloring material. The second normal print mode is a print mode in which an image is formed using the above-described decolorable coloring material. The security print mode is a print mode in which an image is formed using non-decolorable coloring material, and a coating image to cover the image of the non-decolorable coloring material is formed using the decolorable coloring material.

The selection screen 211A includes a "first normal print (decoloring impossible)" button 211A1, a "second normal print (decoloring possible)" button 211A2, a "security print (non-decolorable image+decolorable coating)" button 211A3, and a message area 211A4.

The message area 211A4 is a display area in which a message for urging a user to select a print mode is displayed.

The display unit 211 displays a character string of "SELECT PRINT MODE" and so on, for example, in the message area 211A4, as the message for urging a user to select a print mode.

The button 211A1 is a button which accepts selectin of the first normal print mode by a user.

The button 211A2 is a button which accepts selectin of the second normal print mode by a user.

The button 211A3 is a button which accepts selectin of the security print mode by a user.

Accordingly, a user operates the button 211A1 or 211A2 in accordance with the message displayed in the message area 211A4, and thereby can select any mode of the first normal print mode or the second normal print mode.

The image processing apparatus 100 performs image forming in accordance with the first normal print mode or the second normal print mode accepted via the button 211A1 or 211A2 of the display unit 211.

Further, a user operates the button 211A3 in accordance with the message displayed in the message area 211A4, and thereby can select the security print mode.

The image processing apparatus 100 performs image forming in accordance with the above-described security print mode accepted via the button 211A3 of the display unit 211.

Hereinafter, an operation of the image processing apparatus 100 when a user selects the security print mode will be described. In addition, in the following description, it is assumed that the above-described data of a user who uses the image processing apparatus 100 is previously recorded in the above-described user management database.

Figure 6:
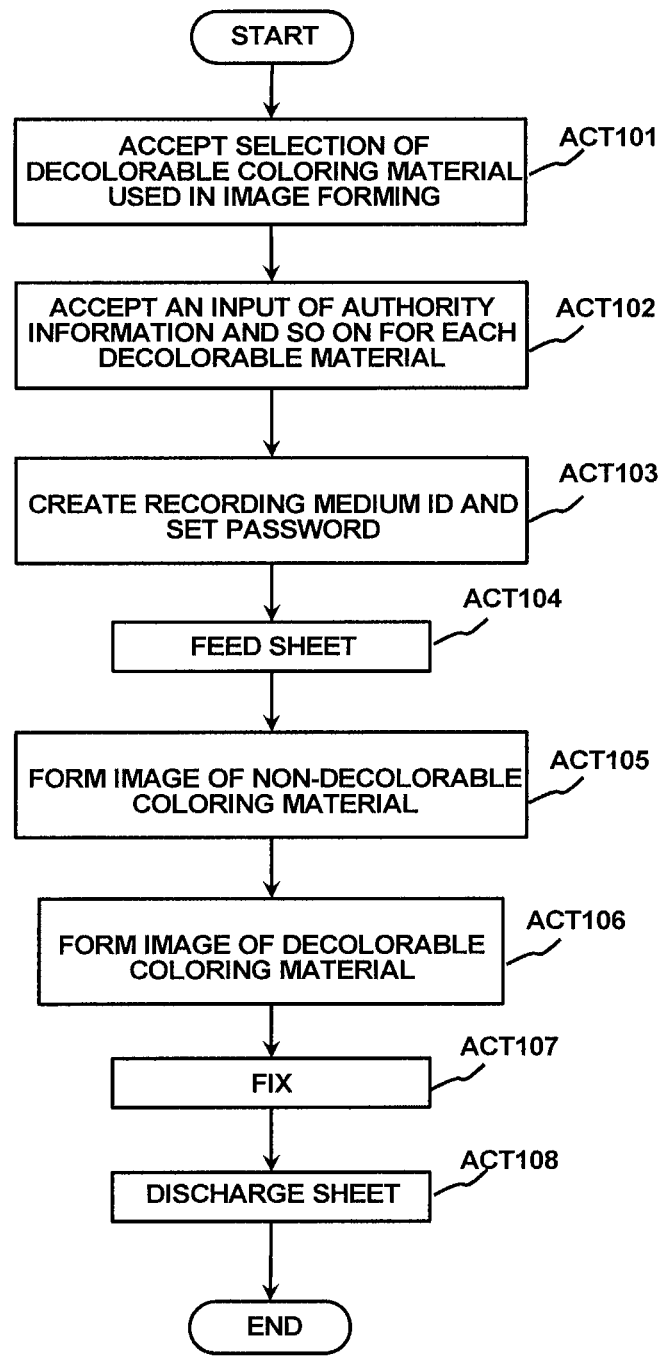
FIG. 6 is a flow chart showing an operation of the image processing apparatus according to the embodiment at the time of image forming.

FIG. 6 is a flow chart showing an operation in the case that the image processing apparatus 100 performs image forming according to the security print mode.

When a user operates the button 211A3 of the selection screen 211A to select the security print mode, as shown in FIG. 6, in ACT101, the CPU 200 controls the display unit 211 of the operation unit 210, so that a first setting screen 211B (refer to FIG. 7) of the security print mode is displayed. The display unit 211 displays the first setting screen 211B shown in FIG. 7.

The first setting screen 211B is a screen for accepting designation of an image area in which a coating image is formed, and selection of decolorable coloring material used for forming a coating image.

The first setting screen 211B includes a plurality of coloring material icons 211B11, 211B12, 211B13, 211B14, and a print preview area 211B4.

The print preview area 211B14 is a display area in which an image of a sheet P on which an image of document to be formed using non-decolorable toner has been formed is displayed. The display unit 211 displays the image of the sheet P in the print preview area 211B4, based on the above-described image data of document.

Out of a plurality of the coloring material icons 211B11-211B14, the coloring material icon 211B11 corresponds to the above-described first decolorable coloring material, the coloring material icon 211B12 corresponds to the above-described second decolorable coloring material, the coloring material icon 211B13 corresponds to the above-described third decolorable coloring material, and the coloring material icon 211B14 corresponds to the above-described fourth decolorable coloring material.

However, as described above, the image processing apparatus 100 can load the two second image forming units 13B.

In other words, the image processing apparatus 100 can load the two second image forming units 13B simultaneously, but cannot load the four second image forming units 13B. Accordingly, when the two second image forming units 13B which form images using the first and second decolorable coloring materials are loaded, the coloring material icons 211B11, 211B12 become in an effective state capable of accepting an operation of a user, and the coloring material icons 211B13, 211B14 becomes in an ineffective state. In contrast, when the two second image forming units 13B which form images using the third and fourth decolorable coloring materials are loaded, the coloring material icons 211B13, 211B14 become in an effective state capable of accepting an operation of a user, and the coloring material icons 211B11, 211B12 becomes in an ineffective state.

Further, the coloring material icons 211B11-211B14 are displayed in the first setting screen 211B in order according to the decoloring temperatures of the corresponding decolorable coloring materials.

Figure 7:
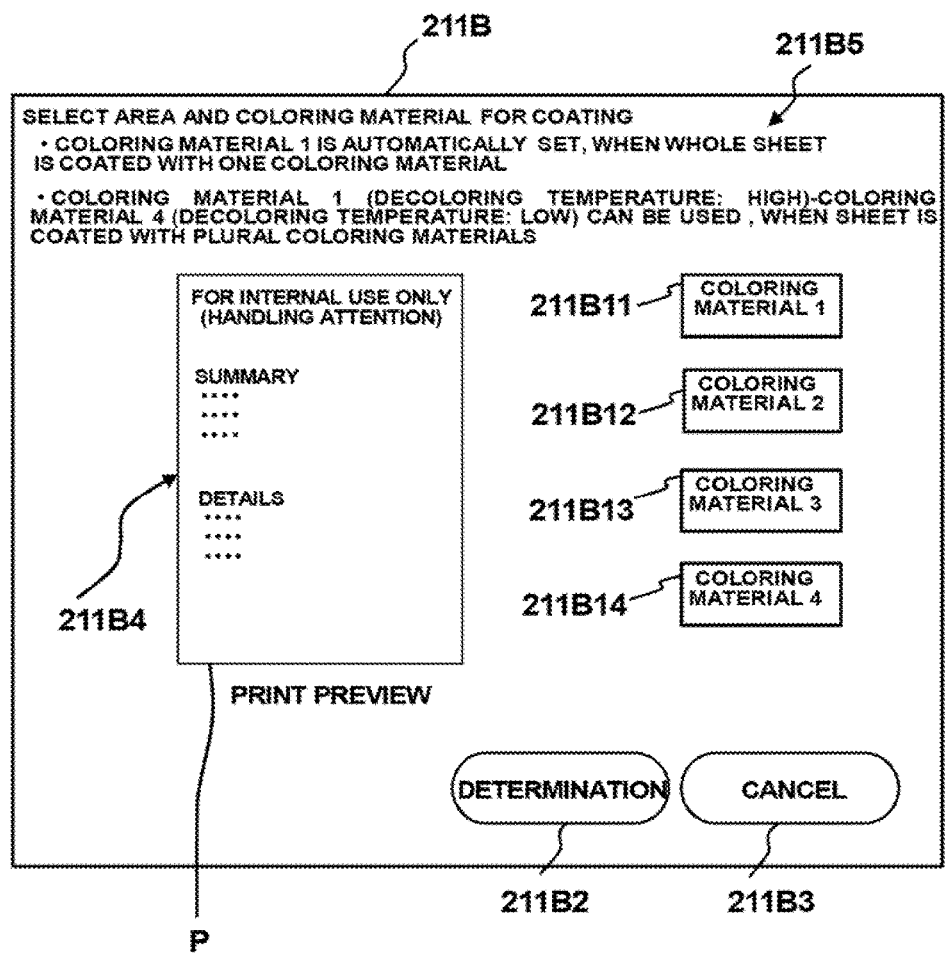
FIG. 7 is a diagram showing an example of a screen which the image processing apparatus according to the embodiment displays prior to image forming.

For example, in FIG. 7, the coloring material icon 211B11 corresponding to the first decolorable coloring material having the highest decoloring temperature is displayed at the topmost position, and the coloring material icon 211B12 corresponding to the second decolorable coloring material having the second highest decoloring temperature is displayed at a second position from the top.

For example, the coloring material icons 211B11, 211B12 that are in the above-described effective state can be moved to optional positions of the preview area 211B4 by an operation of a user, and sizes thereof can be changed in the preview area 211B4.

For example, a user performs a touch operation of any of the coloring material icons 211B11, 211B12, and thereby can select decolorable coloring material corresponding to the relevant coloring material icon, as the decolorable coloring material to be used for a coating image.

Further, a user drags and drops the above-described selected coloring material icon by a touch operation, and thereby can move it to an optional position in the preview area 211B4. Further, a user preforms a touch operation of an end side of a coloring material icon, and thereby can set a size of the coloring material icon. Further, a user selects a center portion of a coloring material icon, and performs an operation of a cursor key, to perform fine adjustment of the position of the coloring material icon. The above-described operation of a user may be performed by a pointing device such as a mouse.

A user can designate an image area where a coating image is formed, by the above-described operations to set the position of the coloring material icon and the size of the coloring material icon.

A user performs the above-described operations to set the position and size of the same coloring material icon, or the different coloring material icons for a plurality of times, and thereby can designate image areas where a plurality of coating images with the same or different kinds of decolorable coloring materials are formed.

The display unit 211 accepts a menu request operation of a user in the first setting screen 211B, to display a pull down menu of the coating image form. The coating image form includes forms, such as a "solid coating" form, a "shaded" form, a "shaded with diagonal lines" form, and various "patterns". The display unit 211 accepts selection of a coating image form by a user, via the pull down menu of the coating image form.

Accordingly, a user selects a desired coloring material icon, and thereby can change the coating image form from the default form (for example, solid coating) to a desired other form (for example, shaded). When the form of the coating image is except "solid coating", since a part of the image by the decolorable coloring material come to be visually recognized, a user selects the form of the coating image, if necessary.

The first setting screen further includes a determination button 211B2, a cancel button 211B3, and a message area 211B5.

In the message area 211B5, a message to urge setting of a coating image and explanation relating to setting of a coating image are displayed.

The display unit 211 displays a character string, such as "SELECT AREA AND COLORING MATERIAL FOR COATING", for example, in the message area 211B5 of the first setting screen 211B, as the message to urge a user to perform setting of a coating image. In addition, the display unit 211 displays a character string, such as "COLORING MATERIAL 1 IS AUTOMATICALLY SET, WHEN WHOLE SHEET IS COATED WITH ONE COLORING MATERIAL", and a character string such as "COLORING MATERIAL 1 (DECOLORING TEMPERATURE: HIGH)-COLORING MATERIAL 4 (DECOLORING TEMPERATURE: LOW) CAN BE USED, WHEN SHEET IS COATED WITH PLURAL COLORING MATERIALS", for example, in the message area 211B5, as the explanation relating to setting of a coating image.

The determination button 211B2 is a button which accepts an operation of a user for instructing setting completion of the coating image.

The cancel button 211B3 is a button which accepts an operation of a user for instructing setting release of the coating image.

When the determination button 211B2 accepts an operation of a user, the operation of the image processing apparatus 100 proceeds to ACT102.

In ACT102, the CPU 200 controls the display unit 211 of the operation unit 210, so that the second setting screen 211C of the security print mode is displayed.

Figure 8:
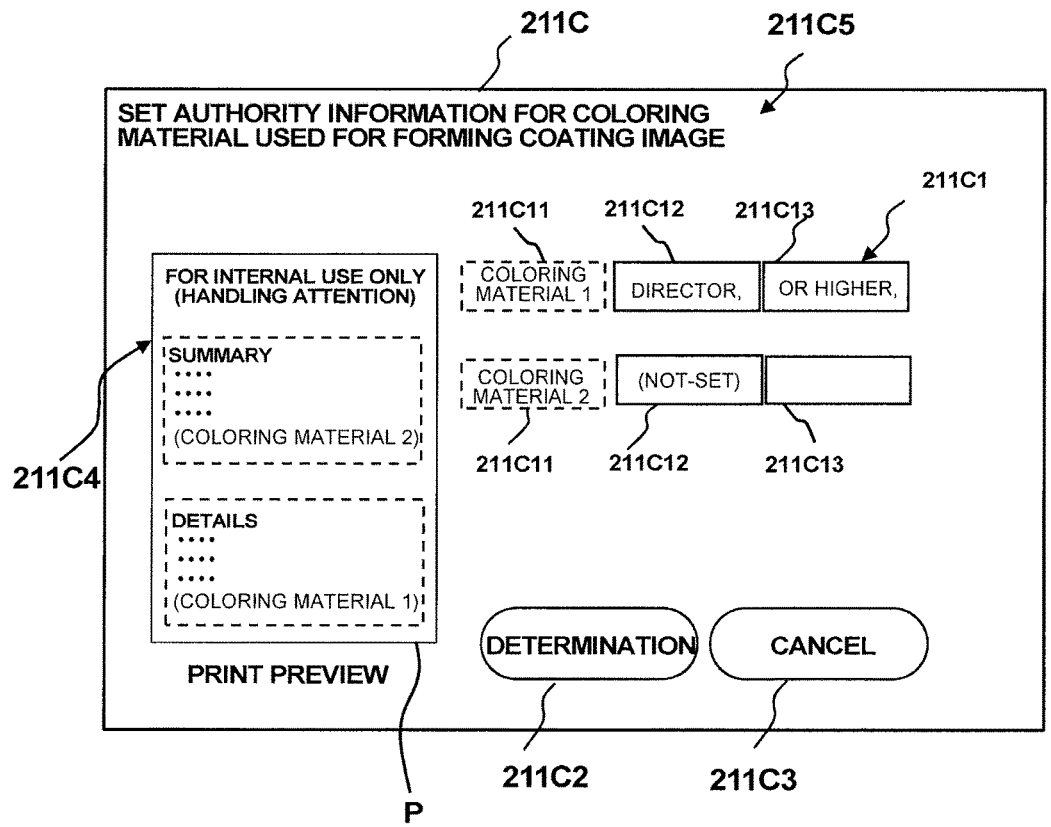
FIG. 8 is a diagram showing an example of a screen which the image processing apparatus according to the embodiment displays prior to image forming.

The display unit 211 displays the second setting screen 211C shown in FIG. 8. The second setting screen 211C is a screen to accept setting of the above-described authority information, for each coloring material for forming a coating image.

The second setting screen 211C includes a message area 211C5, a print preview area 211C4, and the authority information input portion 211C1.

The message area 211C5 is a display area in which a message to urge a user to perform setting of the above-described authority information is displayed.

The display unit 211 displays a character string, such as "SET AUTHORITY INFORMATION FOR COLORING MATERIAL USED FOR FORMING COATING IMAGE", for example, in the message area 211C5, as the message for urging setting of the authority information.

The print preview area 211C4 is a display area in which the coloring material of the coating image and an image area (an area of a chain line in FIG. 8) of the coating image which are determined in the first setting screen shown in FIG. 7 are displayed.

The display unit 211 adds the kind of the coloring material of the coating image and the image area in which the coating image is formed, to the image of the sheet P of the print preview area 211B4 of FIG. 7, and displays the added image in the preview area 211C4.

For example, in the print preview area 211C4 of the second setting screen 211C shown in FIG. 8, an image area of the coating image by the coloring material 2, and an image area of the coating image by the coloring material 1 which have been set in the first setting screen 211B are respectively displayed by one.

The authority information input portion 211C1 accepts an input of a user relating to authority information for each coloring material.

The authority information input portion 211C1 includes a coloring material display portion 211C11, a first input box 211C12, and a second input box 211C13.

The coloring material display portions 211C11 are display portions showing the first and second decolorable coloring materials selected in the first setting screen 211B of FIG. 7. Specifically, the coloring material display portion 211C11 shown as "coloring material 1" in the drawing is a display portion showing the first decolorable coloring material. The coloring material display portion 211C11 shown as "coloring material 2" in the drawing is a display portion showing the second decolorable coloring material.

The first input box 211C12 accepts an input of post information of a user who can decolor the decolorable coloring material.

The second input box 211C13 accepts an input of range information of a post of a user.

The first and second input boxes 211C12, 211C13 are displayed for each the above-described coloring material display portion 211C11.

The post information of a user which is inputted to the first input box 211C12 corresponds to the user information of the above-described user management database (refer to FIG. 3).

The first input box 211C12 accepts a menu request operation of a user, and displays a pull down menu relating to the post information of the user. The user can select any of "president", "director", "manager", "no", for example, in the pull down menu relating to the post information.

Further, the second input box 211C13 accepts a pull-down operation of the user, and displays the pull down menu relating to the range information of the post of the user. In the pull down menu relating to the range information of post, the user can select any of "or higher", "only", "except", for example.

FIG. 8 shows a state in which "director" that is the post information of the user is inputted in the first input box 211C12 corresponding to the coloring material display portion 211C11 of the first decolorable coloring material (coloring material 1), and "or higher" that is the range information of the post of the user is inputted in the second input box 211C13.

Further, FIG. 8 shows a state in which in the first and second input boxes 211C12, 211C13 corresponding to the coloring material display portion 211C11 of the second decolorable coloring material (coloring material 2), the post information of the user and the range information of the post of the user are not inputted, and a character string of "not set" is displayed in the first input box 211C12 instead.

The second setting screen 211C further includes a determination button 211C2 and a cancel button 211C3, in the same manner as the above-described first setting careen.

Figure 9:
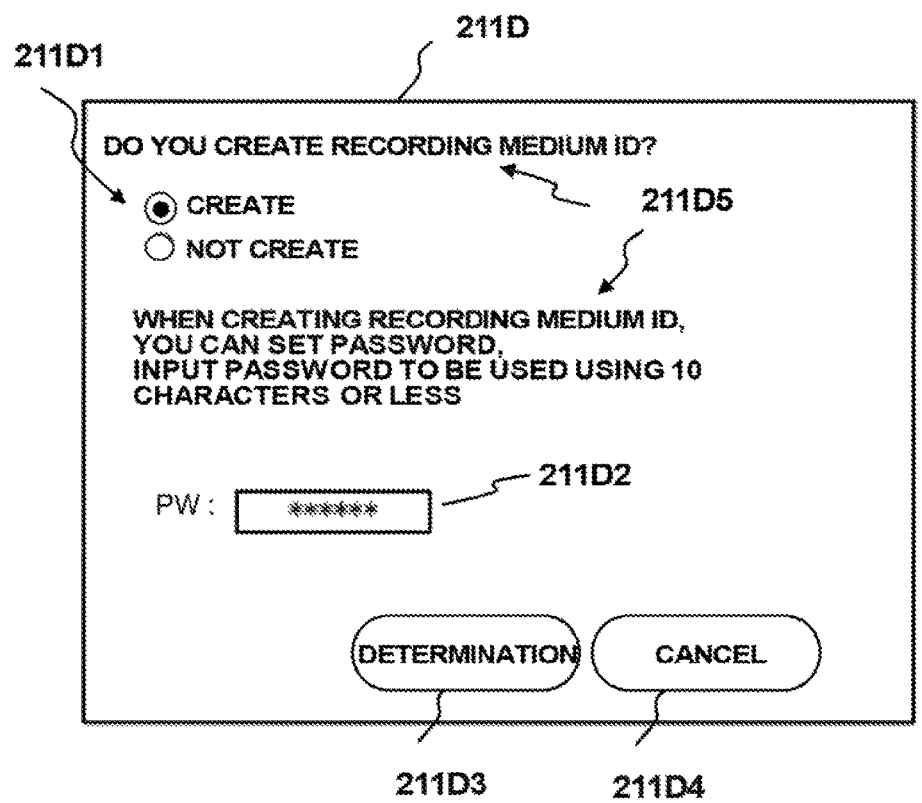
FIG. 9 is a diagram showing an example of a screen which the image processing apparatus according to the embodiment displays prior to image forming.

When the user finishes an input of the above-described authority information, and operates the determination button 211C2 of the second setting screen 211C, the operation of the image processing apparatus 100 proceeds to ACT103. In ACT103, the CPU 200 controls the display unit 211 of the operation unit 210, so that a third setting screen 211D (refer to FIG. 9) of the security print mode is displayed. The display unit 211 displays the third setting screen 211D shown in FIG. 9. The third setting screen 211D is a screen which accepts setting of the above-described storage medium ID to a sheet, and an input of the above-described password.

The third setting screen 211D includes a confirmation portion 211D1, a password input portion 211D2, a message area 211D5, a determination button 211D3, a cancel button 211D4.

The message area 211D5 is a display area in which a confirmation message relating to setting of the recording medium ID, and an explanation message of the password are displayed.

The display unit 211 displays, in the message area 211D5, a character string, such as "DO YOU CREATE RECORDING MEDIUM ID?" for example, as the confirmation message, and a character string, such as "WHEN CREATING RECORDING MEDIUM ID, YOU CAN SET PASSWORD. WHEN CREATING, INPUT PASSWORD TO BE USED USING 10 CHARACTERS OR LESS", for example, as the explanation message of password.

The confirmation portion 211D1 accepts an input by a user as to whether or not to create a recording medium ID.

The password input portion 211D2 accepts an input of a password by a user.

The user selects any of check mark of "create" or "not create" the recording medium ID by a mouse or the like, for example. Further, when setting a password, the user inputs an optional character string by a key button or the like as the password, in the password input portion 211D2. This password is notified to each user registered in the user management database, for example. When not setting a password, a user operates a "determination" button, without inputting a character string.

When having finished the above-described setting relating to the recording medium ID, the user operates the determination button 211D3 in the third setting screen 211D. When the determination button 211D3 accepts the operation of the user, the display unit 211 outputs the above-described setting content accepted via the first to third setting screens 211B-211D to the CPU 200. The CPU 200 temporarily stores the above-described setting content outputted from the display unit 211 in the RAM 203.

In the above-described setting content which has been temporarily stored in the RAM 203, when it is set to create a recording medium ID (refer to FIG. 9), the CPU 200 creates a new recording medium ID, with reference to the above-described recording medium management database. Further, the CPU 200 generates a password (refer to FIG. 9), coloring material to be used for forming the coating image (refer to FIG. 7), an image area in which the coating image is formed (refer to FIG. 7), and authority information of the user (refer to FIG. 8), based on the above-described setting content, in association with the above-described new recording medium ID, and registers them in the recording medium management database (refer to FIG. 4).

In addition, regarding the image area in which the coating image is formed, in the recording medium management database of FIG. 4, simplified area information, such as "upper", "lower", "whole area", "lower left", "upper right" has been exemplified, but actually, position information (coordinate information) on a sheet corresponding to the image area in which the coating image is formed is registered.

When the CPU 200 temporarily stores the above-described setting content in the RAM 203, and registers the above-described setting content in the recording medium management database, the operation of the image processing apparatus 100 proceeds to ACT104. In ACT104, when accepting a start instruction of image forming by a user via the operation unit 210, for example, the CPU 200 starts control for a feeding operation of a sheet.

Specifically, the CPU 200 outputs a control signal to the sheet conveying controller 208.

The sheet conveying controller 208 drives the sheet feeding unit 10 and the sheet conveying motor 209, based on the above-described control signal. The sheet feeding unit 10 feeds a sheet from any of the sheet feeding trays 21-23 to the conveying path 11. The sheet conveying motor 209 makes the conveying rollers of the conveying path 11 to be operated, to convey the sheet fed to the conveying path 11 to the transfer roller 16.

The operation of the image processing apparatus 100 proceeds to ACT105 and ACT106, in accordance with the timing when the sheet is fed to the conveying path 11, for example. In ACT105, when it is set to create the recording medium ID, in the above-described setting content which is temporarily stored in the RAM 203, the CPU 200 generates image data of the print mark 1003 corresponding to the above-described new recording medium ID. The CPU 200 makes the first image forming unit 13A and the transfer belt 13C to be operated, so as to form an image of the non-decolorable coloring material based on the above-described image data of document, and an image of the non-decolorable coloring material based on the image data of the print mark 1003. The first image forming unit 13A forms an image of the non-decolorable coloring material based on the image data of document, and an image of the non-decolorable coloring material based on the image data of the print mark 1003, on the above-described photoconductor, using the decolorable coloring material. The first image forming unit 13A transfers these images of the non-decolorable coloring material from the photoconductor to the transfer belt 13C. The transfer belt 13C runs while carrying the image of the non-decolorable coloring material. The above-described pint mark serves for recognizing the recording medium ID, and includes a dot matrix of n×m. An image of the print mark is formed on an area of the photoconductor corresponding to a margin area (refer to FIG. 10) of a sheet. The print mark may be of any form such as a bar code, if it is of a form in which the recording medium ID can be recognized.

In ACT106, the CPU 200 determines the decolorable coloring material which the second image forming unit 13B uses, based on the information of the decolorable coloring material included in the above-described setting content which is temporarily stored in the RAM 203. Further, the CPU 200 further judges an image area where the coating image included in the above-described setting content is to be formed. The CPU 200 makes the second image forming unit 13B operate, so that the coating image of the above determined decolorable coloring material is formed in the above judged image area. The second image forming unit 13B forms the coating image of the decolorable coloring material, in the area of the photoconductor corresponding to the above judged image area, using the above determined decolorable coloring material. The second image forming unit 13B transfers this coating image of the decolorable coloring material from the photoconductor to the transfer belt 13C to which the image of the above-described non-decolorable coloring material has been transferred. The coating image of the decolorable coloring material is superposed on the image of the above-described non-decolorable coloring material which has been transferred to the area corresponding to the above judged image area, on the transfer belt 13C. Accordingly, the image of the non-decolorable coloring material of the image area designated by the user in the above-described second setting screen 211C is covered by the coating image of the decolorable coloring material designated by the user in the above-described first setting screen 211B.

The transfer belt 13C runs while carrying the image of the above-described non-decolorable coloring material, and the coating image of the decolorable coloring material, to convey the image of the non-decolorable coloring material, and the coating image of the decolorable coloring material to a position opposite to the transfer roller 16. The transfer roller 16 transfers the image of the above-described non-decolorable coloring material, and the coating image of the decolorable coloring material to a sheet which has been conveyed through the conveying path 11, in cooperation with the transfer belt 13C. The transfer roller 16 conveys the sheet to which the above-described image of the non-decolorable coloring material, and the coating image of the decolorable coloring material have been transferred, to the heating unit 15.

When the transfer roller 16 transfers the image of the above-described non-decolorable coloring material, and the coating image of the decolorable coloring material to the sheet, the operation of the image processing apparatus 100 proceeds to ACT107. In ACT107, the CPU 200 controls heat generating operation of the heater 205, so that the temperature of the roller pair of the heating unit 15 becomes a prescribed fixing temperature, when the sheet reaches the heating unit 15. The roller pair of the heating unit 15 heats the image of the non-decolorable coloring material, and the coating image of the decolorable coloring material which have been transferred to the sheet, by the heat generated by the heater 205, to fix them to the sheet.

When the heating unit 15 fixes the image of the above-described non-decolorable coloring material, and the coating image of the decolorable coloring material to the sheet, the operation of the image processing apparatus 100 proceeds to ACT108. In ACT108, the CPU 200 controls the sheet conveying controller 208 so as to discharge the sheet to the sheet discharge unit 20. The sheet conveying controller 208 makes the conveying rollers of the conveying path 11 to be operated, to convey the sheet which passes through the heating unit 15 to the sheet discharge unit 20. The sheet discharge unit 20 houses the sheet to be conveyed in any discharge tray out of a plurality of the discharge trays.

The image processing apparatus 100 finishes a print operation of the security print mode to a sheet by the operation as described above.

Figure 10:
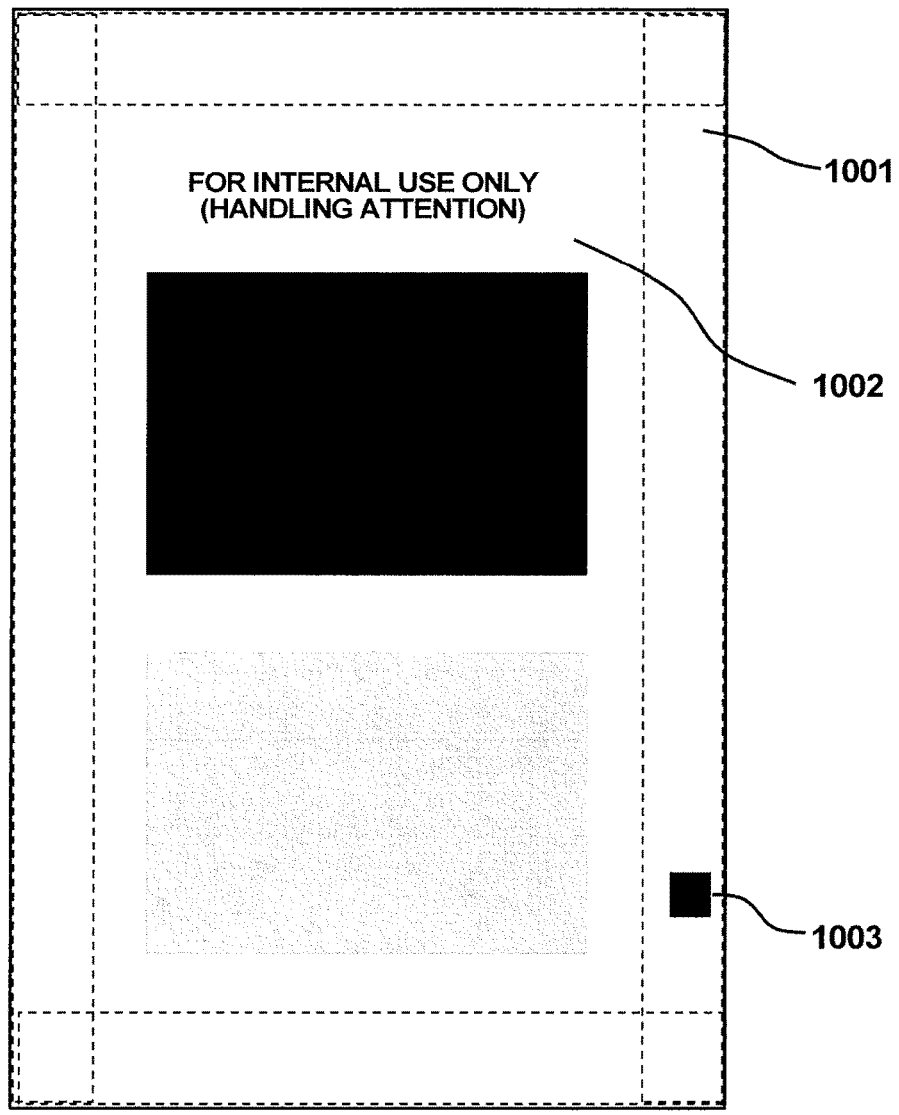
FIG. 10 is a diagram schematically showing an example of a sheet formed with an image by the image processing apparatus according to the embodiment.

FIG. 10 is a diagram showing an example of a sheet on which an image has been printed in the security print mode. On a sheet of FIG. 10, an image is formed so that the above-described authority information can be grasped. That is, as shown in FIG. 10, the print mark 1003 relating to the authority information is printed in a margin area 1001 (lower right side of sheet P) shown by a dashed line, in a sheet P. The print position of the print mark 1003 is not limited to the position of the above-described area, but may be other position, if the print mark 1003 can be read by the sheet reading unit 14. In addition, a coating image is not formed on a character string of "for internal use only (handling attention)" that is a title of a document, out of an image formed in a print area 1002 other than the margin area 1001 in the sheet P. Accordingly, anyone can understand that an image including the information for internal use only (handling attention) is formed on this sheet, but the specific information content cannot be visually recognized by the coating image of the decolorable coloring material. The sheet shown in FIG. 10 is an example of a case in which two coating images of a "solid coating" form of default are formed, but a coating image of a "shaded" form, for example, may be formed, so that a part of the image in an area covered with the coating image can be visually recognized. The form of the coating image is designated by a user in the first setting screen 211B, as described above.

As described above, the image processing apparatus 100 can superpose the coating image using the decolorable coloring material, on characters and so on indicating specific information included in the image formed using the non-decolorable coloring material, in the security print mode. Accordingly, the image processing apparatus 100 can perform security printing to print an image in a state in which the specific information cannot be visually recognized. Further, the image processing apparatus 100 can set, in addition to the security printing like this, the above-described recording medium ID for each sheet by a user's setting, and further can set a password in association with the recording medium ID.

Accordingly, the image processing apparatus 100 can selectively decolor the above-described decolorable coloring material, in a decoloring operation described later, based on the above-described authority information.

Accordingly, the image processing apparatus 100 can perform security protection at the time of restoration (decoloring operation) of an image which has been printed in the security print mode, for example.

In addition, in the above-described embodiment, the print mark 1003 relating to the above-described authority information has been described as a mark corresponding to a recording medium ID, but the print mark 1003 is not limited to a mark corresponding to a recording medium ID. The print mark 1003 may be a mark corresponding to decolorable coloring material to be used and authority information (refer to FIG. 4) for each decolorable coloring material, for example. In this case, in the above-described ACT105, the CPU 200 generates image data of the print mark 1003 corresponding to the decolorable coloring material and the authority information for each decolorable coloring material, so that the authority information can be grasped.

Figure 11:
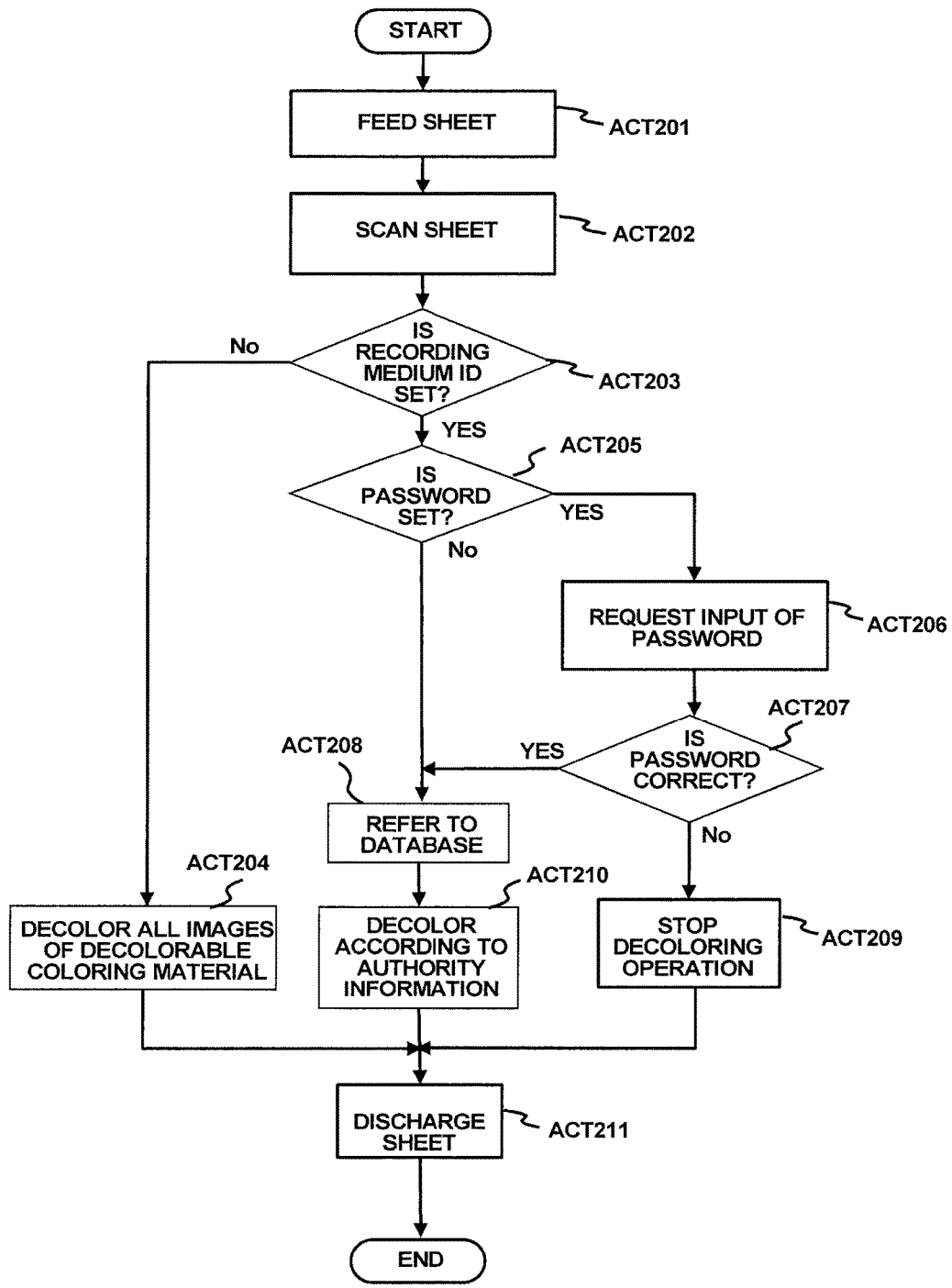
FIG. 11 is a flow chart showing an operation of the image processing apparatus according to the embodiment at the time of image decoloring.

Next, a decoloring operation when the image processing apparatus 100 functions as a decoloring apparatus will be described. FIG. 11 is a flow chart showing a decoloring operation of the image processing apparatus 100.

A user operates the operation unit 210 of the image processing apparatus 100, to input an instruction of a start of decoloring. When the operation unit 210 accepts the instruction of a start of decoloring by a user, the CPU 200 starts control for sheet feeding operation in ACT201 of FIG. 11. Specifically, the CPU 200 outputs a control signal to the sheet conveying controller 208. The sheet conveying controller 208 drives the sheet feeding unit 10 and the sheet conveying motor 209, based on the above-described control signal. The sheet feeding unit 10 feeds a sheet from any sheet feeding tray out of the sheet feeding trays 21-23 to the conveying path 11. The sheet conveying motor 209 makes the conveying rollers of the conveying path 11 to be operated, to convey the sheet fed to the conveying path 11 to the reading position by the sheet reading unit 14.

When the sheet reaches the reading position by the sheet reading unit 14, the operation of the image processing apparatus 100 proceeds to ACT202. In ACT202, the sheet reading unit 14 scans the both surfaces of the sheet, to acquire image data of the both surfaces of the sheet. The CPU 200 stores the image data of the both surfaces of the sheet which has been acquired by the sheet reading unit 14 in the RAM 203.

When the image data of the both surfaces of the sheet is stored in the RAM 203, the operation of the image processing apparatus 100 proceeds to ACT203. In ACT203, judges presence/absence of the formation of the print mark 1003 relating to the authority information in the sheet, based on the image data of the both surfaces of the sheet stored in the RAM 203, to determine whether or not the above-described recording medium ID has been set. That is, when judging that the print mark 1003 is formed on the sheet, the CPU 200 determines that the recording medium ID is set, and when judging that the print mark 1003 is not formed on the sheet, the CPU 200 determines that the recording medium ID is not set. When the CPU 200 determines that the recording medium ID is not set (No in ACT203), the operation of the image processing apparatus 100 proceeds to ACT204. When the CPU 200 determines that the recording medium ID is set (Yes in ACT203), the operation of the image processing apparatus 100 proceeds to ACT205.

In ACT204, the CPU 200 controls the sheet conveying controller 208 and the heating unit 15, so that the all coating images formed on the sheet are decolored. The sheet conveying controller 208 drives the sheet conveying motor 209, and thereby makes the conveying rollers of the conveying path 11 to be operated, to convey a sheet to the heating unit 15. Further, the CPU 200 controls the heat generating operation of the heater 205, so that when the sheet reaches the heating unit 15, the temperature of the roller pair of the heating unit 15 becomes a prescribed decoloring temperature. The above-described prescribed temperature is a temperature at which the all decolorable coloring materials used in the all coating images are decolored. The above-described prescribed decoloring temperature is a decoloring temperature of the first decolorable coloring material having a higher decoloring temperature out of the above-described first and second decolorable coloring materials. The roller pair of the heating unit 15 decolors the all coating images of the decolorable coloring materials formed on the sheet, by the heat generated by the heater 205. This coating image is decolored, and thereby the image of the non-decolorable coloring material which has been covered with the coating image comes to be visually recognized.

In this manner, in the present embodiment, when the recording medium ID is not set, it is regarded that a non-decolorable image formed on a sheet has low confidentiality, for example, and thereby decoloring processing of the coating image is performed, without requiring processing of inputting a password or the like described later.

On the other hand, in ACT205, the CPU 200 recognizes the recording medium ID corresponding to the print mark 1003 relating to the authority information which is included in the above read image data. The CPU 200 refers to the above-described recording medium management database, based on the above-described recognized recording medium ID. The CPU 200 refers to the recording medium management database, to determine whether or not the above-described password is set in association with the above-described recording medium ID. When the CPU 200 determines that the password is set in the above-described recording medium ID (Yes in ACT205), the operation of the image processing apparatus 100 proceeds to ACT206. When the CPU 200 determines that the password is not set in association with the above-described recording medium ID (No in ACT205), the operation of the image processing apparatus 100 proceeds to ACT208.

In ACT206, the CPU 200 controls the display unit 211 of the operation unit 210, so that an input screen 211F (refer to FIG. 12) for image decoloring is displayed. The display unit 211 displays the input screen 211F shown in FIG. 12.

The input screen 211F is a screen for accepting an input of the above-described password by a user.

Figure 12:
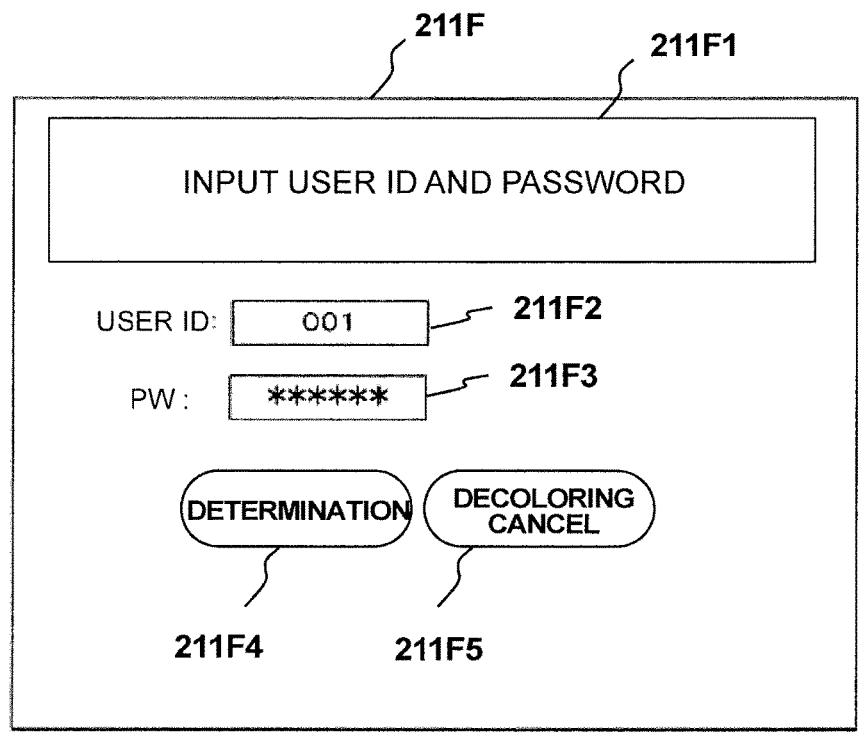
FIG. 12 is a diagram showing an example of a screen which the image processing apparatus according to the embodiment displays prior to image decoloring.

As shown in FIG. 12, the input screen 211F includes a message area 211F1, a user ID input portion 211F2, a password input portion 211F3, a determination button 211F4, and a decoloring cancel button 211F5.

In the message area 211F1, a message which requests a user to input a password, in addition to the above-described user ID is displayed. The display unit 211 displays a character string, such as "INPUT USER ID AND PASSWORD", for example, in the message area 211F1, as the request message.

The user ID input portion 211F2 accepts an input of a user ID by a user. The user operates the key button or the like of the operation unit 210, to input a character string indicating a user ID, to the user ID input portion 211F2.

The password input portion 211F3 accepts an input of a password by a user. The user operates the key button or the like of the operation unit 210, to input a character string indicating a password, to the password input portion 211F3.

The determination button 211F4 accepts an operation of a user for instructing input completion of the user ID and the password. When completing the input of the above-described user ID and the password, the user operates the determination button 211F4.

The decoloring cancel button 211F5 accepts an operation of a user for instructing decoloring cancellation. When cancelling the above-described start instruction of the decoloring operation, the user operates the decoloring cancellation button 211F5.

The input screen 211F of FIG. 12 is a screen for requesting a user to input a user ID and to input a password, but when a user logs in the image processing apparatus 100, for example, in case that the image processing apparatus 100, has accepted an input of a user ID by a user, the input screen may be a screen to request a user to input only a password.

When the above-described determination button 211F4 accepts a determination input by a user, the display unit 211 outputs the user ID inputted in the above-described user ID input portion 211F2, and the password inputted in the password input portion 211F3 to the CPU 200. The CPU 200 stores the user ID, and the password which have been outputted from the display unit 211, in the RAM 203, for example.

In the above-described ACT206, when the display unit 211 outputs the above-described user ID, and the password to the CPU 200, the operation of the image processing apparatus 100 proceeds to ACT207. In ACT207, the CPU 200 refers to the recording medium management database (FIG. 4), based on the above recognized recording medium ID (refer to the above-described ACT205). The CPU 200 refers to the recording medium management database, to judge a password corresponding to the above recognized recording medium ID in the recording medium management database. The CPU 200 determines whether or not this judged password (password corresponding to the above recognized recording medium ID), and the password stored in the RAM 203 (password which a user has inputted) coincide with each other. When the CPU 200 determines that the above-described both passwords coincide (Yes in ACT207), the operation of the image processing apparatus 100 proceeds to ACT208. When the CPU 200 determines that the above-described both passwords do not coincide (No in ACT207), the operation of the image processing apparatus 100 proceeds to ACT209. In ACT209, the CPU 200 stops the decoloring operation of the image processing apparatus 100. Further, the CPU 200 controls the display unit 211, so that an error message to the effect that the password inputted by a user is incorrect to the user is displayed.

On the other hand, in ACT 208, the CPU 200 refers to the user management database and the recording medium management database. The CPU 200 refers to the user management database, to grasp user information (post information) corresponding to the user ID. Further, the CPU 200 refers to the recording medium management database, to grasp authority information corresponding to the above grasped user information. The CPU 200 grasps decolorable coloring material used in the coating image which the specific user based on this grasped authority information can decolor. When the CPU 200 grasps the decolorable coloring material based on the above-described authority information, the operation of the image processing apparatus 100 proceeds to ACT210. In ACT210, the CPU 200 controls the sheet conveying controller 208 and the heating unit 15, so that the decolorable coloring material based on the above-described authority information is decolored. In other words, the CPU 200 controls the sheet conveying controller 208 and the heating unit 15, so that the coating image is decolored in accordance with the above-described authority information.

The sheet conveying controller 208 drives the sheet conveying motor 209, and thereby makes the conveying rollers of the conveying path 11 to be operated, to convey a sheet to the heating unit 15. Further, the CPU 200 controls the heat generating operation of the heater 205, so that when the sheet reaches the heating unit 15, the temperature of the roller pair of the heating unit 15 becomes a prescribed decoloring temperature. The prescribed decoloring temperature in this case is a temperature at which the decolorable coloring material (refer to ACT 208) based on the above-described authority information is decolored. That is, the CPU 200 determines the above-described decoloring temperature to the decoloring temperature of the decolorable coloring material based on the above-described authority information. The CPU 200 controls the heat generating operation of the heater 205, so that the temperature of the roller pair of the heating unit 15 becomes the above determined decoloring temperature. The roller pair of the heating unit 15 decolors only the coating image of the decolorable coloring material based on the above-described authority information on the sheet P, by the heat generated by the heater 205.

When the recording medium ID which has been recognized in the above-described ACT205 is "P001", for example, or in the case of the setting content in the second setting screen 211C of FIG. 8, only a specific user having a post of a director or higher can decolor the coating image at the image area "lower" in which the first decolorable coloring material (coloring material 1) having a high decoloring temperature is used. On the other hand, even a user of no post can decolor the coating image at the image area "upper" in which the second decolorable coloring material (coloring material 2) having a low decoloring temperature is used.

Accordingly, when the recording medium ID is "P001", for example, and a full name of a user who wishes the decoloring is Ichiro YAMADA (001), Wataru TANAKA (002), or Yoshiko SAKUMA (003), for example, the CPU 200 grasps the above-described authority information with reference to the user management database (refer to FIG. 3) and the recording medium management database (refer to FIG. 4), to determine the above-described prescribed decoloring temperature to a decoloring temperature of the first decolorable coloring material (coloring material 1). The CPU 200 controls the heat generating operation of the heater 205, so that the temperature of the roller pair of the heating unit 15 becomes the above determined decoloring temperature (decoloring temperature of the decolorable coloring material 1). The roller pair of the heating unit 15 decolors the coating image of the first decolorable coloring material (coloring material 1) formed on the sheet, by the heat generated by the heater 205. Further, the above determined decoloring temperature (the decoloring temperature of the first decolorable coloring material) is a temperature not less than the decoloring temperature of the second decolorable coloring material. Accordingly, the roller pair of the heating unit 15 decolors the coating image of the second decolorable coloring material (coloring material 2) along with the coating image of the first decolorable coloring material (coloring material 1) formed on the sheet, by the heat generated by the heater 205.

On the other hand, even when the recording medium ID is "P001", for example, when a full name of a user who wishes the decoloring is Michiko HOSHINO (004), or Susumu SATO (005), for example, the CPU 200 grasps the above-described authority information with reference to the user management database (refer to FIG. 3) and the recording medium management database (refer to FIG. 4), to determine the above-described prescribed decoloring temperature to a decoloring temperature of the second decolorable coloring material (coloring material 2). The CPU 200 controls the heat generating operation of the heater 205, so that the temperature of the roller pair of the heating unit 15 becomes the above determined decoloring temperature (the decoloring temperature of the second decolorable coloring material). The roller pair of the heating unit 15 decolors only the coating image of the second decolorable coloring material (coloring material 2) formed on the sheet, by the heat generated by the heater 205.

As described above, in the present embodiment, different decoloring operations are executed depending on the presence/absence of setting of the recording medium ID. Further, even when the recording medium ID is set, different decoloring operations are executed in accordance with the authority information. Accordingly, out of the decolorable coloring material to be used in the coating image formed on a sheet, the decolorable coloring material in accordance with the authority information of the above-described recording medium management database is decolored. The coating image is decolored, and thereby an image of the non-decolorable coloring material which has been covered with the coating image becomes to be visually recognized.

Accordingly, a use can perform security setting while performing various grading (relative merits).

When the operation of the above-described ACT 210, ACT204, or ACT 209 is finished, the operation of the image processing apparatus 100 proceeds to ACT211. In ACT211, the CPU 200 controls the sheet conveying controller 208, so that a sheet is discharged. The sheet conveying controller 208 drives the sheet conveying motor 209, and thereby makes the conveying rollers of the conveying path 11 to be operated, to convey the sheet to the sheet discharge unit 20. The sheet discharge unit 20 houses the sheet to be conveyed to any discharge tray out of a plurality of the discharge trays. By the operation described above, the image processing apparatus 100 finishes the decoloring operation for one sheet.

In addition, the image processing apparatus 100 has a decoloring image selection function to accept selection of a coating image (decolorable coloring material) to be decolored by a user, prior to the decoloring operation of the above-described ACT210. According to this decoloring image selection function, a user satisfying a specific condition, such as a specific user given with an authority capable of decoloring the decolorable coloring material (first decolorable coloring material) having a high decoloring temperature, for example, can select a coating image (decolorable coloring material) to be decolored, before the decoloring operation.

In the above-described ACT208, for example, when a specific user based on the authority information is a user given with an authority capable of decoloring the first decolorable coloring material, the CPU 200 controls the display unit 211, so that a selection screen 211G (refer to FIG. 13) for the above-described decoloring image selection function. A manager or the like of the image processing apparatus 100 can previously set whether or not to display the selection screen 211G for the above-described decoloring image selection function on the display unit 211. When it is set that the selection screen 211G is not to be displayed, for example, the CPU 200 does not make the selection screen 211G to be displayed on the display unit 211. Accordingly, when it is set that the selection screen 211G is not to be displayed, a user cannot use the above-described decoloring image selection function.

Figure 13:
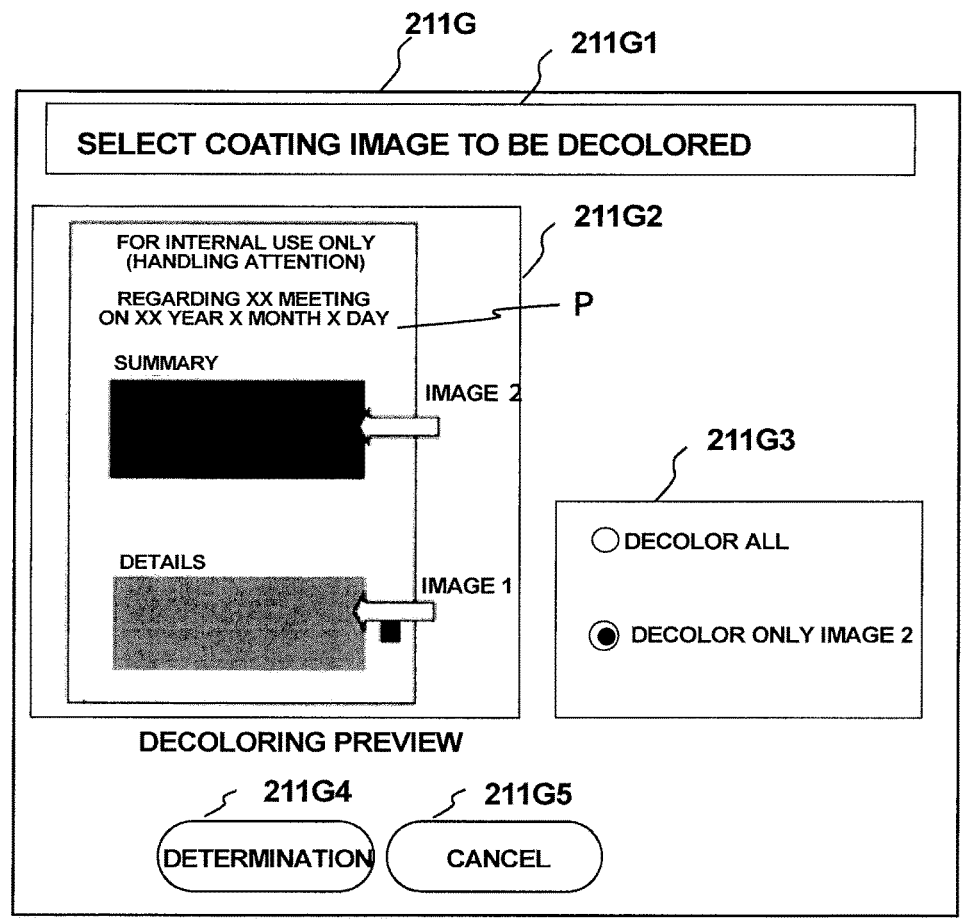
FIG. 13 is a diagram showing an example of a screen which the image processing apparatus according to the embodiment displays prior to image decoloring.

Hereinafter, the selection screen of the decoloring image selection function will be described in detail with reference to FIG. 13. FIG. 13 is a diagram showing the selection screen 211G to accept selection of a coating image (decolorable coloring material) to be decolored by a user.

As shown in FIG. 13, the selection screen 211G has a message area 211G1, a decoloring preview area 211G2, a decoloring image selection portion 211G3, a determination button 211G4, and a cancel button 211G5.

In the message area 211G1, a message to urge a user to select a coating image to be decolored is displayed. The display unit 211 displays a character string, such as "SELECT COATING IMAGE TO BE DECOLORED" in the message area 211G1, as the above-described message. In the decoloring preview area 211G2, a sheet P formed with an image before decoloring processing is displayed. The display unit 211 displays the image (refer to ACT202) of the sheet P read by the sheet reading unit 14, in the decoloring preview area 211G2.

For example, in the decoloring preview area 211G2 of FIG. 13, a sheet P is displayed on which a coating image of an image 1 is formed in the lower side area in the drawing, and a coating image of an image 2 is formed in the upper side area. Further, in the decoloring preview area 211G2, an image (a part of a document image) of the non-decolorable coloring material which is not covered with the coating image is displayed in the above-described sheet P. The coating image of the image 1 is an image in which the first decolorable coloring material having the highest decoloring temperature is used, for example, and the coating image of the image 2 is an image in which the second decolorable coloring material having a low decoloring temperature is used, for example.

In addition, in the example of FIG. 13, an image of a character string indicating a title called "regarding XX meeting on XX year X month X day", for example, and an image of a character string indicating headings called "summary" and "details", for example, are formed in the sheet P, as the image of the non-decolorable coloring material which is not covered with the coating image.

In addition, as described above, the selection screen 211G of FIG. 13 is displayed on the display unit 211, when the specific user based on the authority information is a user given with the authority capable of decoloring the first decolorable coloring material, in the above-described ACT208. In other words, a user to operate a screen of the selection screen 211G of FIG. 13 is a user given with authority capable of decoloring the first decolorable coloring material, such as a user having a post of a president or a director.

As described above, in the decoloring preview area 211G2 of the selection screen 211G, the image of the sheet P read by the sheet reading unit 14 in ACT202 is displayed. Further, in the preview area 211G2, the coating image of the image 1 and the coating image of the image 2 are displayed.

A user operates the above-described decoloring image selection portion 211G3, with reference to the image of the sheet P which is displayed in the decoloring preview area 211G2, to select a coating image to be decolored of the decolorable coloring material.

The above-described decoloring image selection portion 211G3 is a selection portion which accepts selection of the coating image to be decolored of the decolorable coloring material by a user.

In the decoloring image selection portion 211G3, a user can select any of "decolor all" or "decolor only image 2". When a user wants to decolor the all coating images (coating images of image 1 and image 2) displayed in the decoloring preview area 211G2, for example, the user selects a check mark of "decolor all". When a user wants to decolor only the coating image of the image 2 displayed in the decoloring preview area 211G2, for example, the user selects a check mark of "decolor only image 2". The decoloring image selection portion 211G3 shown in FIG. 13 is in a state that the check mark of "decolor only image 2" is selected.

As described above, in the decoloring image selection portion 211G3 shown in FIG. 13, a user can select any of "decolor all" or "decolor only image 2".

Accordingly, when a user want to know the content of "summary" of "meeting on XX year X month X day", for example, the user selects the check mark of "decolor only image 2".

The above-described determination button 211G4 accepts completion of the selection by a user. When having finished selection of the coating image to be decolored, the user operates the determination button 211G4.

The above-described cancel button 211G5 accepts cancellation of the selection by a user. When cancelling selection of the coating image to be decolored, a user operates the cancel button 211G4.

When the above-described determination button 211G4 accepts completion of the selection by a user, the display unit 211 outputs the above-described selection content accepted via the selection screen 211G to the CPU 200.

In the decoloring image selection screen 211G, a coating image of the decolorable coloring material to be decolored is selected as described above, the CPU 200 controls the heating unit 15 in the above-described ACT210, so that the above selected decolorable coloring material is decolored.

Accordingly, even when the user is a user (president or director, for example) given with authority to decolor the all coating images, the user can decolor only the coating image (second decolorable coloring material) of the image 2, without decoloring the coating image (first decolorable coloring material) of the image 1 in FIG. 13.

For example, when a user who has read the content of "summary", in the sheet P in which the coating image of the image 2 has been decolored, further thinks it necessary to know up to the content of "details" covered with the image 1, the user has only to set the sheet P again in the sheet feeding unit 10 of the image processing apparatus 100, to perform the decoloring processing of the coating image of the image 1.

On the other hand, when a user thinks it unnecessary to know up to the content of "details", it is not necessary to perform the decoloring processing again. Accordingly, a user can store the sheet P in the state that the image 1 has not been decolored, or can dispose the sheet P by a shredder or the like.

Regardless of that a specific user (president or director, for example) given with the authority capable of decoloring the decolorable coloring material (first decolorable coloring material) having the highest decoloring temperature can decolor the all coating images (decolorable coloring material), the user uses the decoloring image selection function, and thereby can selectively decolor only a part of the coating images (only second decolorable coloring material, for example).

In the preview area 211G2 of FIG. 13, for example, "XX meeting on XX year X month X day" which is described in the title portion of the sheet P is a meeting which only one director (Wataru TANAKA, for example) out of the users registered in the user management database attends, and other persons (a registered user of a manager or lower, for example) may not attend this meeting.

In such a case, the director who is a user to attend the meeting needs to know up to the content of "details", but attendants who are not registered in the user management database have only to grasp the content of "summary".

Accordingly, when it is presumed that a person other than the director who is a registered user sees the sheet P after decoloring processing, the director who is the registered user selects the check mark of "decolor only image 2" from the screen of FIG. 13, and operates the "determination" button.

In the selection screen 211G of FIG. 13, when the user selects the check mark of "decolor only image 2", and operates the "determination" button, the display unit 211 outputs the above-described selection content accepted via the selection screen 211G to the CPU 200, as described above. The CPU 200 controls the heating unit 15, so that the above selected second decolorable coloring material is decolored, in the above-described ACT210.

As a result of this, only the coating image of the image in the sheet P displayed in the preview area 211G2 is decolored. The person other than the director who is the user sees the sheet P after the decoloring processing, and can know only the content of "summary" of "XX meeting on XX year X month X day".

On the other hand, when the person other than the director who is the registered user does not see the sheet P after decoloring processing, the director who is the registered user selects the check mark of "decolor all" from the screen of FIG. 13, and operates the "determination" button.

In the selection screen 211G of FIG. 13, when a user selects the check mark of "decolor all" and operates the "determination" button, the display unit 211 outputs the above-described selection content accepted via the selection screen 211G to the CPU 200, as described above.

The CPU 200 controls the heating unit 15, so that the above selected first and second decolorable coloring materials are decolored, in the above-described ACT210.

As a result of this, the coating images of the image 1 and the image 2 in the sheet P displayed in the preview area 211G2 are decolored. The director who is the registered user sees the sheet P after decoloring processing, and thereby can know the content of "summary" and "details" of "XX meeting on XX year X month X day".

In addition, as described above, the print mark 1003 relating to the authority information may be a mark corresponding to the decolorable coloring material to be used and authority information (refer to FIG. 4) for each decolorable coloring material. In this case, the CPU 200 grasps the decolorable coloring material and the authority information for each decolorable coloring material, based on the print mark 1003, without referring to the user management database (refer to FIG. 3) and the recording medium management database (refer to FIG. 4), in the above-described ACT208.

The image processing apparatus 100 according to the present embodiment has the configuration as described above, and executes the above-described processing and operation, and thereby can selectively decolors a plurality of the decolorable coloring materials based on the above-described authority information.

Accordingly, it is possible to properly maintain the security of the sheet P, for example, by the image processing apparatus 100.

Further, in the image processing apparatus 100 according to the present embodiment, it is possible to perform flexible and fine security setting, at the time of image forming, in accordance with a class (post) of the organization, the property of the document included in the image of the sheet P, and so on.

Further, the image processing apparatus 100 according to the present embodiment can also select the image (coating image) to be decolored, or the coloring material to be decolored at the time of decoloring image, if necessary, and thereby it is possible to shorten a processing time of decoloring, and various costs can be saved.

In the above-described embodiment, the first image forming unit 13A is made a unit in which an electrophotographic system to use non-decolorable toner as the non-decolorable coloring material is adopted, but it is not limited to this.

The first image forming unit 13A may be made a unit in which an ink jet system to use non-decolorable ink as the non-decolorable coloring material is adopted.

When the first image forming unit 13A is a unit of an ink jet system, the heating unit 15 does not function as the fixing unit, but functions as only the decoloring unit.

Similarly, the second image forming unit 13B may be made a unit in which an ink jet system to use decolorable ink as the decolorable coloring material is adopted.

In the above-described embodiment, the recording medium ID and the password are configured to be stored in the storage device 207 of the image processing apparatus 100, but they are not limited to this.

That is, the recording medium ID and the password may be configured to be stored in an external device of the image processing apparatus 100, such as a network server. In addition, regarding holding subjects of the recording medium management database and the user management database, the same may be applied as described above. When the recording medium management database and the user management database are stored in an external device of the image processing apparatus 100, the CPU 200 of the image processing apparatus 100 communicates with the external device via the I/F 206, and thereby may perform the update of the database and the reference to the database.

In addition, when a unit of an ink jet system is used, the transfer belt 13C is not used, but the unit of the above-described ink jet system may be arranged along the conveying path 11.

The image processing apparatus 100 of the above-described embodiment manages the authority information capable of decoloring the decolorable coloring material for each sheet, in the recording medium management database, but the method of managing the authority information is not limited to this.

That is, the image processing apparatus 100 of the embodiment may manage the authority information for each file composed of a plurality of pages, in the recording medium management database.

When the authority information is managed for each file, the image processing apparatus 100, at the time of image forming operation, regarding one file, prints a unique print mark 1003 relating to the authority information for each sheet and gives a recording medium ID by a serial number for each sheet, and generates the above-described authority information for each recording medium ID of one file. The decoloring operation of the image processing apparatus 100 is fundamentally the same as the above-described embodiment.

In addition, when a part of a plurality of sheets composing the one file is missing, it is preferable that the image processing apparatus 100, at the time of decoloring operation, displays a display screen for performing warning of that effect or confirmation request to a user, and then continues the decoloring operation.

With the configuration like this, the image processing apparatus 100 can process a lot of sheets composing one file at one time.

In the above-described embodiment, the image processing apparatus 100 performs the display of various screens and the acceptance of an input operation by a user, by means of the display unit 211 and the operation unit 210 of the image processing apparatus 100, but the display of various screens and an input operation by a user are not limited to these.

That is, the image processing apparatus 100 may perform the above-described display of various screens, and a part or all of acceptances of input operations by users, by means of an external device, such as a client PC.

In the above-described embodiment, the image processing apparatus 100 is configured such that the sheet reading unit is not operated when performing image forming, but the operation of the image processing apparatus 100 is not limited to this.

That is, the image processing apparatus 100 can also make the sheet reading unit 14 operate, to read an image of a sheet, when performing image forming.

In this case, the CPU 200 of the image processing apparatus 100 judges whether or not the print mark 1003 relating to the authority information has been correctly read by the sheet reading unit 14.

When the CPU 200 determines that the print mark 1003 cannot be read, the CPU 200 makes the display unit 211 perform the display of an error of the effect that the print mark 1003 cannot be read, the display of a guide whether or not to perform image forming with another sheet again, or the display to urge discarding of the sheet in error.

In addition, a plurality of the decolorable coloring materials in the above-described embodiment are coloring materials which can be decolored by being heated at different decoloring temperatures, but the decolorable coloring materials may be coloring materials which are decolored with other decoloring conditions. For example, a plurality of the decolorable coloring materials may be coloring materials which can be decolored by being irradiated with lights of different wavelengths.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   a processor that:
      determines an image area of a recording medium on which to form a coating image using a first decolorable material selected from a plurality of decolorable materials, and
      generates authority information indicating one or more specific users, out of a plurality of users, with authority to decolor the first decolorable material, wherein each of the plurality of decolorable materials are decolored at different prescribed decoloring conditions; and
   an image forming unit controlled to:
      form an image corresponding to image data on the recording medium using a non-decolorable material,
      form the coating image on the recording medium in the determined image area using the first decolorable material so that the coating image coats at least a part of the formed image corresponding to the image data, and
      form a mark indicating the authority information on the recording medium on which the image corresponding to the image data and the coating image are formed.

2. The image forming apparatus according to claim 1, further comprising;
   a storage unit that stores the authority information;
   wherein the processor controls the storage unit to store, for each recording medium on which a coating image is formed using any one of the plurality of decolorable materials, the authority information, and information indicating the decolorable materials used to form the respective coating image.

3. The image forming apparatus according to claim 2, wherein:
   for each recording medium on which an image is formed, the processor:
      generates recording medium identification data for identifying the recording medium on which the image is formed, and
      controls the storage unit to store the authority information in association with the recording medium identification data.

4. The image forming apparatus according to claim 3, wherein:
   the processor generates image data of the mark corresponding to the recording medium identification data; and
   the image forming unit forms, on the recording medium, an image of the mark corresponding to the recording medium identification data, based on the image data of the mark.

5. The image forming apparatus according to claim 3, further comprising:
an input device configured to accept information of the decolorable material out of the plurality of decolorable materials to be used in the coating image, the authority information for each of the decolorable materials, and the recording medium identification data, that are input by a user;
wherein the processor controls the storage unit to store the information of the decolorable material, and the authority information for each of the decolorable materials, that have been accepted, in association with the accepted recording medium identification data.

6. The image forming apparatus according to claim 1, wherein:
the image forming unit includes a first image forming unit to form an image using the non-decolorable material, and a second image forming unit to form an image using the plurality of decolorable materials.

7. The image forming apparatus according to claim 6, wherein:
the second image forming unit forms the coating image with the decolorable material to visually obscure at least a part of the image corresponding to the image data.

8. The image forming apparatus according to claim 1, wherein:
the prescribed decoloring conditions for the plurality of decolorable materials are different decoloring temperatures, respectively.

9. The image forming apparatus according to claim 1, wherein:
the processor generates image data of the mark corresponding to information of the first decolorable material to be used and the generated authority information; and
the image forming unit forms the mark based on the image data of the mark.

10. A decoloring apparatus, comprising:
a decoloring unit configured to decolor a coating image formed on a recording medium using a selected one or more of a plurality of decolorable materials having different decoloring conditions, wherein the coating image covers at least a part of an image which is formed on the recording medium using a non-decolorable material; and
a processor configured to:
determine authority information indicating one or more specific users, out of a plurality of users, with authority to decolor one of the decolorable materials, for each of the decolorable materials, and
control a decoloring operation of the decoloring unit, so that the coating image formed of the selected decolorable material is decolored in accordance with the determined authority information.

11. The decoloring apparatus according to claim 10, further comprising:
a storage unit that stores the authority information;
wherein the processor controls the storage unit to store, for each recording medium on which a coating image is formed using any one of the plurality of decolorable materials, the authority information for the decolorable material used to form the coating image, in association with recording medium identification data for identifying the recording medium.

12. The decoloring apparatus according to claim 11, further comprising:
a sheet reading device configured to read a mark formed on the recording medium, the mark corresponding to the recording medium identification data;
wherein the processor controls the decoloring operation of the decoloring unit, in accordance with the authority information stored in the storage unit, and in association with the recording medium identification data corresponding to the mark read by the sheet reading device.

13. The decoloring apparatus according to claim 10, wherein:
the different decoloring conditions for the plurality of decolorable materials are different decoloring temperatures, respectively.

14. The decoloring apparatus according to claim 13, wherein:
the decoloring unit heats the recording medium at a heating temperature in accordance with the corresponding decoloring temperature, so as to decolor the coating image; and
the processor controls the heating temperature of the decoloring unit, in accordance with the authority information.

15. The decoloring apparatus according to claim 10, further comprising:
a sheet reading device configured to read a mark formed on the recording medium, the mark corresponding to information of the decolorable material used to form the coating image on the recording medium and the authority information for the decolorable material;
wherein the processor determines the decolorable material used to form the coating image and the authority information for the decolorable material, based on the mark read by the sheet reading unit, and controls the decoloring operation of the decoloring unit, in accordance with the decolorable material determined to be used to form the coating image and the determined authority information for the decolorable material.

16. An image forming method, comprising:
determining an image area of a recording medium on which to form a coating image using a first decolorable material selected from a plurality of decolorable materials;
generating authority information indicating one or more specific users, out of a plurality of users, with authority to decolor the first decolorable material, wherein each of the plurality of decolorable materials are decolored at different prescribed decoloring conditions;
forming an image corresponding to image data on the recording medium using a non-decolorable material;
forming the coating image on the recording medium in the determined image area using the first decolorable material so that the coating image coats at least a part of the formed image corresponding to the image data; and
forming a mark indicating the authority information on the recording medium on which the image corresponding to the image data and the coating image are formed, with an image forming unit.

* * * * *